(12) United States Patent
Benko et al.

(10) Patent No.: US 8,311,866 B1
(45) Date of Patent: Nov. 13, 2012

(54) SYSTEM AND METHOD FOR CUSTOMIZING CAREER PATHS

(75) Inventors: Cathleen Benko, Redwood City, CA (US); Anne Weisberg, New York, NY (US); Molly Anderson, Alameda, CA (US)

(73) Assignee: Deloitte Development LLC, Hermitage, TN (US)

( * ) Notice: Subject to any disclaimer, the term of this patent is extended or adjusted under 35 U.S.C. 154(b) by 1025 days.

(21) Appl. No.: 12/283,611

(22) Filed: Sep. 12, 2008

Related U.S. Application Data

(60) Provisional application No. 60/993,653, filed on Sep. 12, 2007.

(51) Int. Cl.
*G06Q 10/00* (2012.01)

(52) U.S. Cl. ................................ 705/7.12

(58) Field of Classification Search .................. 705/7.12
See application file for complete search history.

(56) References Cited

U.S. PATENT DOCUMENTS

| | | | |
|---|---|---|---|
| 6,213,780 B1* | 4/2001 | Ho et al. ........................ 434/219 |
| 6,275,812 B1* | 8/2001 | Haq et al. ...................... 705/7.14 |
| 6,754,874 B1* | 6/2004 | Richman ........................ 715/205 |
| 7,437,309 B2* | 10/2008 | Magrino et al. ............. 705/7.14 |
| 7,519,539 B1* | 4/2009 | Fliess et al. .................... 705/301 |
| 2002/0046074 A1* | 4/2002 | Barton ............................. 705/8 |
| 2003/0177027 A1* | 9/2003 | DiMarco ......................... 705/1 |
| 2003/0187725 A1* | 10/2003 | Jotkowitz ....................... 705/11 |
| 2004/0219493 A1* | 11/2004 | Phillips .......................... 434/118 |
| 2005/0096973 A1* | 5/2005 | Heyse et al. ................... 705/11 |
| 2006/0195335 A1* | 8/2006 | Christian et al. ................ 705/1 |
| 2008/0015912 A1* | 1/2008 | Rosenthal et al. ............... 705/7 |
| 2009/0132313 A1* | 5/2009 | Chandler et al. ................ 705/7 |
| 2009/0204490 A1* | 8/2009 | Squillace et al. .............. 705/14 |
| 2010/0057659 A1* | 3/2010 | Phelon et al. .................. 706/46 |

OTHER PUBLICATIONS

Tam Yeuk-Mui, M., Korczynski, M., & Frenkel, S. J. (2002). Organizational and Occupational Commitment: Knowledge Workers in Large Corporations. Journal of Management Studies, 39(6), 775-801. Retrieved from EBSCOhost.*

Deborah A O'Neil, & Diana Bilimoria. (2005). Women's career development phases: Idealism, endurance, and reinvention. Career Development International, 10(3), 168-189. Retrieved Oct. 1, 2011, from ABI/INFORM Global. (Document ID: 862992961).*

(Continued)

*Primary Examiner* — Lynda Jasmin
*Assistant Examiner* — George H Walker
(74) *Attorney, Agent, or Firm* — Kramer Levin Naftalis & Frankel LLP

(57) ABSTRACT

A computer-implemented system and method for customizing a worker's career development within an organization is provided. Information concerning the worker is obtained by either or both soliciting input directly from the worker and retrieving the information from one or more databases containing such information. The information is applied to a set of stored rules for defining available options along predefined career dimensions reflective of career-life fit. Based on application of the information to the set of stored rules, a profile is automatically created. If the profile accurately reflects the career-life fit goals of the worker, it is used as the operative profile for the worker until it is appropriate or necessary to change it. If the worker desires to change his/her profile at any time, with the assistance and approval power of a counselor and/or other representative(s) of the organization, the profile is adjusted to reflect the career-life fit goals of the worker within programmed and other parameters that are acceptable to the organization.

9 Claims, 25 Drawing Sheets

OTHER PUBLICATIONS

Forrier, Anneleen, Sels, Luc and Verbruggen, Marijke, Career Counseling in the new Career Era: A Study about the Influence of Career Types, Career Satisfaction and Career Management on the Need for Career Counseling (2005). Available at SSRN: http://ssrn.com/abstract=878279.*

Kimberly S McDonald, & Linda M Hite. (2005). Reviving the Relevance of Career Development in Human Resource Development. Human Resource Development Review, 4(4), 418-439. Retrieved Oct. 1, 2011, from ABI/INFORM Global. (Document ID: 936318261).*

Amelia Jane Wise, & Lynne J Millward. (2005). The experiences of voluntary career change in 30-somethings and implications for guidance. Career Development International, 10(5), 400-417. Retrieved Oct. 1, 2011, from ABI/INFORM Global. (Document ID 896031721).*

Robert Barner. (2006). The targeted assessment coaching interview :Adapting the assessment process to different coaching requirements. Career Development International, 11(2), 96-107. Retrieved Oct. 1, 2011, from ABI/INFORM Global. (Document ID: 1073502271).*

* cited by examiner

PACE

PROVIDES CHOICES TO ACCELERATE OR DECELERATE THE RATE OF CAREER DEVELOPMENT, GROWTH, AND/OR PROGRESSION. REALIZED PACE RESULTS FROM DEMONSTRATED, SUSTAINED PERFORMANCE.

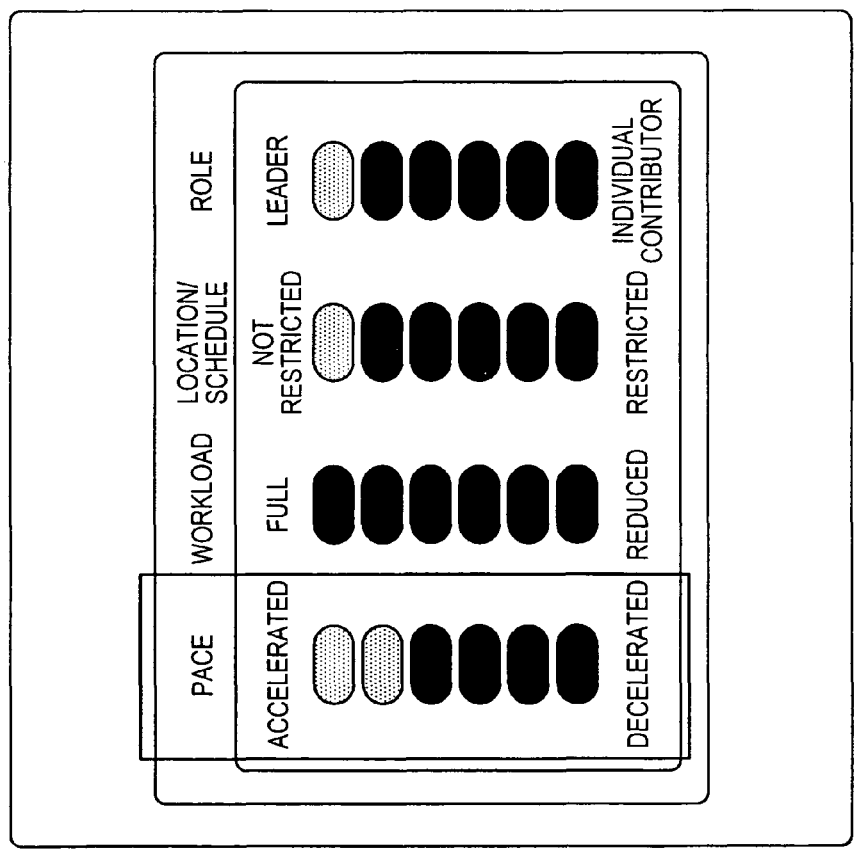

EXAMPLE

6. PLANNING SIGNIFICANTLY FASTER RATE OF CAREER GROWTH

5. PLANNING SOMEWHAT FASTER RATE OF CAREER GROWTH

4. PLANNING TYPICAL RATE OF CAREER GROWTH

3. PLANNING SOMEWHAT SLOWER RATE OF CAREER GROWTH

2. PLANNING MODERATELY SLOWER RATE OF CAREER GROWTH

1. PLANNING SIGNIFICANTLY SLOWER RATE OF CAREER GROWTH

FIG. 1B

WORKLOAD

PROVIDES CHOICES ABOUT THE QUANTITY OF WORK OUTPUT.

| PACE | WORKLOAD | LOCATION/SCHEDULE | ROLE | | EXAMPLE |
|---|---|---|---|---|---|
| ACCELERATED | FULL | NOT RESTRICTED | LEADER | | 6. 100% |
| | | | | | 5. 90% |
| | | | | | 4. 80% |
| | | | | | 3. 70% |
| | | | | | 2. 60% |
| DECELERATED | REDUCED | RESTRICTED | INDIVIDUAL CONTRIBUTOR | | 1. 0-60% |

FIG. 1C

LOCATION/SCHEDULE SUBCONTINUUM:
TRAVEL

EXAMPLE

6. AVAILABLE FOR RELOCATION

5. AVAILABLE FOR EXTENSIVE TRAVEL INCLUDING WEEKENDS AND/OR FREQUENT GLOBAL TRAVEL

4. REGULAR TRAVEL AS REQUIRED BY POSITION

3. MINOR LIMITATIONS ON TRAVEL

2. MODERATE LIMITATIONS ON TRAVEL

1. NO ABILITY TO TRAVEL FOR ANY PURPOSE OR DURATION

*FIG. 1D-1*

LOCATION/SCHEDULE SUBCONTINUUM:
WORK LOCATION

EXAMPLE

6. NO RESTRICTIONS

5. WORK REMOTELY 20% OF WORK TIME

4. WORK REMOTELY 40% OF WORK TIME

3. WORK REMOTELY 60% OF WORK TIME

2. WORK REMOTELY 80% OF WORK TIME

1. UNABLE TO WORK IN OFFICE, REMOTE WORK ONLY REQUIRED

*FIG. 1D-2*

LOCATION/SCHEDULE SUBCONTINUUM:
SCHEDULE

EXAMPLE

6. NO SCHEDULE RESTRICTIONS

5. SCHEDULE AS REQUIRED BY POSITION

4. MINOR LIMITATIONS ON SCHEDULE

3. MODERATE LIMITATIONS ON SCHEDULE

2. SIGNIFICANT LIMITATIONS ON SCHEDULE

1. HIGHLY CONSTRAINED SCHEDULE;
NOT ABLE TO VARY HOURS WITH BUSINESS NEEDS

FIG. 1D-3

| PROFILE ADMINISTRATION | BUSINESS GROUP ADMINISTRATION | REPORTS |
|---|---|---|

⊟ SEARCH

⑦

LAST NAME: [    ]  FIRST NAME: [    ]  PERSONNEL NO: [    ]
LEVEL: [SELECT ONE ▼]  BUSINESS GROUP: [SELECT ONE ▼]  SERVICE AREA: [SELECT ONE ▼]
OFFICE: [SELECT ONE ▼]  SHOW: ◉ ALL COUNSELEES  ○ ACTION REQUIRED  [RESET] [SEARCH]

⊟ SEARCH RESULTS

[< PREVIOUS PAGE] [NEXT PAGE >]  GO TO PAGE: [1] OF 2 [GO]

| ☐ | NAME ▽ | BUSINESS GROUP | SERVICE AREA | OFFICE | CAREER LEVEL | COUNSELOR | ACTION REQUIRED | FWA |
|---|---|---|---|---|---|---|---|---|
| ☐ | MICKEY MOUSE | CONSULTING | TECHNOLOGY INTEGRATION | CHICAGO | SENIOR MGR. | | ASSIGN COUNSELOR | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |
| ☐ | | | | | | | | |

CLICK A NAME TO EDIT PROFILE
[RELEASE SELECTED] [CHANGE COUNSELOR]

ADJUST PROFILE
(CONTINUED)

A THE INDIVIDUAL PROFILE WILL OPEN FOR ADJUSTMENTS

FIG. 6D

A  REVIEW 'ACTION REQUIRED' RECORDS TO MAKE COUNSELOR ASSIGNMENTS

ASSIGN COUNSELOR

PROFILE ADMINISTRATION

| PROFILE ADMINISTRATION | BUSINESS GROUP ADMINISTRATION | REPORTS |

☐ SEARCH

LAST NAME: [ ]  FIRST NAME: [ ]  PERSONNEL [ ]
LEVEL: [SELECT ONE ▼]  BUSINESS GROUP: [SELECT ONE ▼]  SERVICE AREA: [SELECT ONE ▼]
OFFICE: [SELECT ONE ▼]  SHOW: ⦿ ALL COUNSELEES  ○ ACTION REQUIRED
[RESET] [SEARCH]

{APPLY ACTION REQUIRED OR ALL COUNSELEES FILTER}

{ACTION REQUIRED COLUMN HAS SPECIFIC INSTRUCTIONS}

☐ SEARCH RESULTS

[< PREVIOUS PAGE]  [NEXT PAGE >]  GO TO PAGE: [ ] [GO] ⓘ

| ☐ | NAME △ | BUSINESS GROUP | SERVICE AREA | OFFICE | CAREER LEVEL | COUNSELOR | ACTION REQUIRED | FWA |
|---|---|---|---|---|---|---|---|---|
| ☐ | MICKEY MOUSE | CONSULTING | TECHNOLOGY INTEGRATION | CHICAGO | SENIOR MGR. | | ASSIGN COUNSELOR | NO |
| ☐ | | | | | | | | NO |
| ☐ | | | | | | | | NO |
| ☐ | | | | | | | | NO |
| ☐ | | | | | | | | NO |
| ☐ | | | | | | | | NO |
| ☐ | | | | | | | | NO |
| ☐ | | | | | | | | NO |

CLICK A NAME TO EDIT PROFILE
[RELEASE SELECTED] [CHANGE COUNSELOR] [SET REPORT ACCESS]

{CLICK ON NAME TO SELECT COUNSELEE RECORD}

{CLICK ON CHANGE COUNSELOR BUTTON TO ASSIGN COUNSELOR}

FIG. 6E

▷ ASSIGNMENT SCREEN LAUNCHES UPON CLICKING CHANGE COUNSELOR

FIG. 7

| PROFILE ADMINISTRATION | BUSINESS GROUP ADMINISTRATION | REPORTS |

☐ MICKEY MOUSE

| LEVEL: | SENIOR MANAGER | REGION: | MIDWEST | HIRE DATE: | SEPTEMBER 07, 2004 |
| COUNSELOR: | JANE DOE | OFFICE: | CHICAGO | RECENT REHIRE DATE: | |
| LEGAL ENTITY: | | BUSINESS GROUP: | CONSULTING | LAST PROMOTION: | |
| HR MODEL: | | SERVICE AREA: | TECHNOLOGY INTEGRATION | PY 2008 RATING: | |
| FOCUS AREA: | | SERVICE LINE: | SYSTEMS INTEGRATION | PY 2007 RATING: | |
| | | INDUSTRY: | | PY 2006 RATING: | |

☐ MY PROFILE

SELECT PROFILE:

PENDING COUNSELEE REVIEW

PENDING COUNSELEE REVIEW — PROFILE

| COMMON PROFILE | PACE | WORKLOAD | LOCATION/SCHEDULE | ROLE | | TRAVEL | WORK LOCATION | SCHEDULE |
|---|---|---|---|---|---|---|---|---|
| ACTION REQUIRED: TO VALIDATE YOUR PROFILE, EITHER SELECT SUBMIT TO INDICATE THAT THIS PROFILE MEETS YOUR CURRENT CAREER-LIFE FIT CHOICES OR TO MAKE CHANGES, ADJUST THE DOTS, ENTER COMMENTS AND CHOOSE PROPOSE NEW PROFILE | ACCELERATED / DECELERATED | FULL / REDUCED | NOT RESTRICTED / RESTRICTED | LEADER / INDIVIDUAL CONTRIBUTOR | LOCATION/SCHEDULE SUBCONTINUUM | NOT RESTRICTED / RESTRICTED / N/A | NOT RESTRICTED / RESTRICTED / N/A | NOT RESTRICTED / RESTRICTED / N/A |

+ OR - INDICATES PROPOSED CHANGES TO PROFILE

NOTE: ANY DIAL DOWN ON LOCATION/SCHEDULE SUB-CONTINUUMS MADE AS REASONABLE ACCOMMODATIONS UNDER THE AMERICANS WITH DISABILITY ACT, STATE DISABILITY STATUTE OR FOR RELIGIOUS OBSERVATION WILL NOT BE CONSIDERED AS HAVING AN IMPACT ON AN INDIVIDUAL'S PACE.

COMMENTS FROM COUNSELEE

COMMENTS FROM COUNSELOR                                                                  DATE ENDORSED:

COMMENTS FROM ADMINISTRATOR

☐ IN PROPOSING THIS PROFILE, I HAVE OR WILL MODIFY MY GOALS AS NECESSARY. PLEASE SUMMARIZE GOAL CHANGES IN THE COUNSELEE COMMENTS ABOVE

[PROPOSE NEW PROFILE] [SUBMIT] [PRINT TO PDF] [CANCEL]

---

COUNSELEE DASHBOARD

▲ COUNSELEE WILL VALIDATE PROFILE ON THE "COUNSELEE DASHBOARD"

TWO CHOICES

▲ COUNSELEE WILL CLICK ON "SUBMIT" IF DISPLAYED PROFILE MEETS CURRENT CAREER-LIFE FIT CHOICES

▲ COUNSELEE WILL CHANGE DOTS AS NEEDED AND CLICK ON "PROPOSE NEW PROFILE" TO MAKE A CHANGE (CHECK BOX TO CONFIRM THAT THEY HAVE/WILL MODIFY GOALS (AS NEEDED))

(VALIDATION BUTTONS ARE LOCATED HERE)

FIG. 8A

COUNSELOR | DASHBOARD

| ⊞ DOE, J |
| ⊞ MY PROFILES |
| ⊞ MY COUNSELEES |

| NAME △ | STATUS | PROFILE DATE |
|---|---|---|
| MICKEY MOUSE | PENDING COUNSELOR REVIEW | 11/31/2008 |
| | | |
| | | |
| | | |
| | | |
| | | |

RED, BOLD TEXT INDICATES YOUR ACTION IS REQUIRED.

FEATURES:
➤ COUNSELOR DASHBOARD OPENS WITH COLLAPSED HEADER SECTIONS
➤ HEADER SECTIONS EXPAND TO DISPLAY DETAILED RECORDS
➤ COUNSELEE HYPERLINKS WILL LAUNCH COUNSELEE PROFILES SCREEN

FIG. 8B

| PROFILE ADMINISTRATION | BUSINESS GROUP ADMINISTRATION | REPORTS |

⊟ MICKEY MOUSE

| LEVEL: | SENIOR MANAGER | REGION: | MIDWEST | HIRE DATE: | SEPTEMBER 07, 2004 |
| COUNSELOR: | JANE DOE | OFFICE: | CHICAGO | RECENT REHIRE DATE: | |
| LEGAL ENTITY: | | BUSINESS GROUP: | CONSULTING | LAST PROMOTION: | |
| HR MODEL: | | SERVICE AREA: | TECHNOLOGY INTEGRATION | PY 2008 RATING: | |
| FOCUS AREA: | | SERVICE LINE: | SYSTEMS INTEGRATION | PY 2007 RATING: | |
| | | INDUSTRY: | | PY 2006 RATING: | |

SELECT PROFILE:
PENDING COUNSELOR REVIEW

COMMON PROFILE

PENDING COUNSELOR REVIEW

| PACE | WORKLOAD | LOCATION/SCHEDULE |
| ACCELERATED / DECELERATED | FULL / REDUCED | NOT RESTRICTED / RESTRICTED |

PROFILE

| ROLE |
| LEADER / INDIVIDUAL CONTRIBUTOR |

LOCATION/SCHEDULE SUBCONTINUUM

| TRAVEL | WORK LOCATION | SCHEDULE |
| NOT RESTRICTED / RESTRICTED / NA | NOT RESTRICTED / RESTRICTED / NA | NOT RESTRICTED / RESTRICTED / NA |

+ OR - INDICATES PROPOSED CHANGES TO PROFILE

NOTE: ANY DIAL DOWN ON LOCATION/SCHEDULE SUB-CONTINUUMS MADE AS REASONABLE ACCOMMODATIONS UNDER THE AMERICANS WITH DISABILITY ACT, STATE DISABILITY STATUTE OR FOR RELIGIOUS OBSERVATION WILL NOT BE CONSIDERED AS HAVING AN IMPACT ON AN INDIVIDUAL'S PACE.

COMMENTS FROM COUNSELEE

COMMENTS FROM COUNSELOR

COMMENTS FROM ADMINISTRATOR                    DATE ENDORSED:

| ENDORSE PROFILE | RETURN FOR REVIEW | PRINT TO PDF | CANCEL |

TWO OPTIONS FOR THE COUSELOR
▲ ONCE THEY REACH AGREEMENT, THE COUNSELOR CLICKS "ENDORSE PROFILE"
▲ COUNSELOR MAY "RETURN FOR REVISION" TO ROUTE BACK TO COUNSELEE

COUNSELOR CAN INPUT COMMENTS PRIOR TO SELECTING EITHER OPTION

BUTTONS FOR TWO OPTIONS LISTED HERE

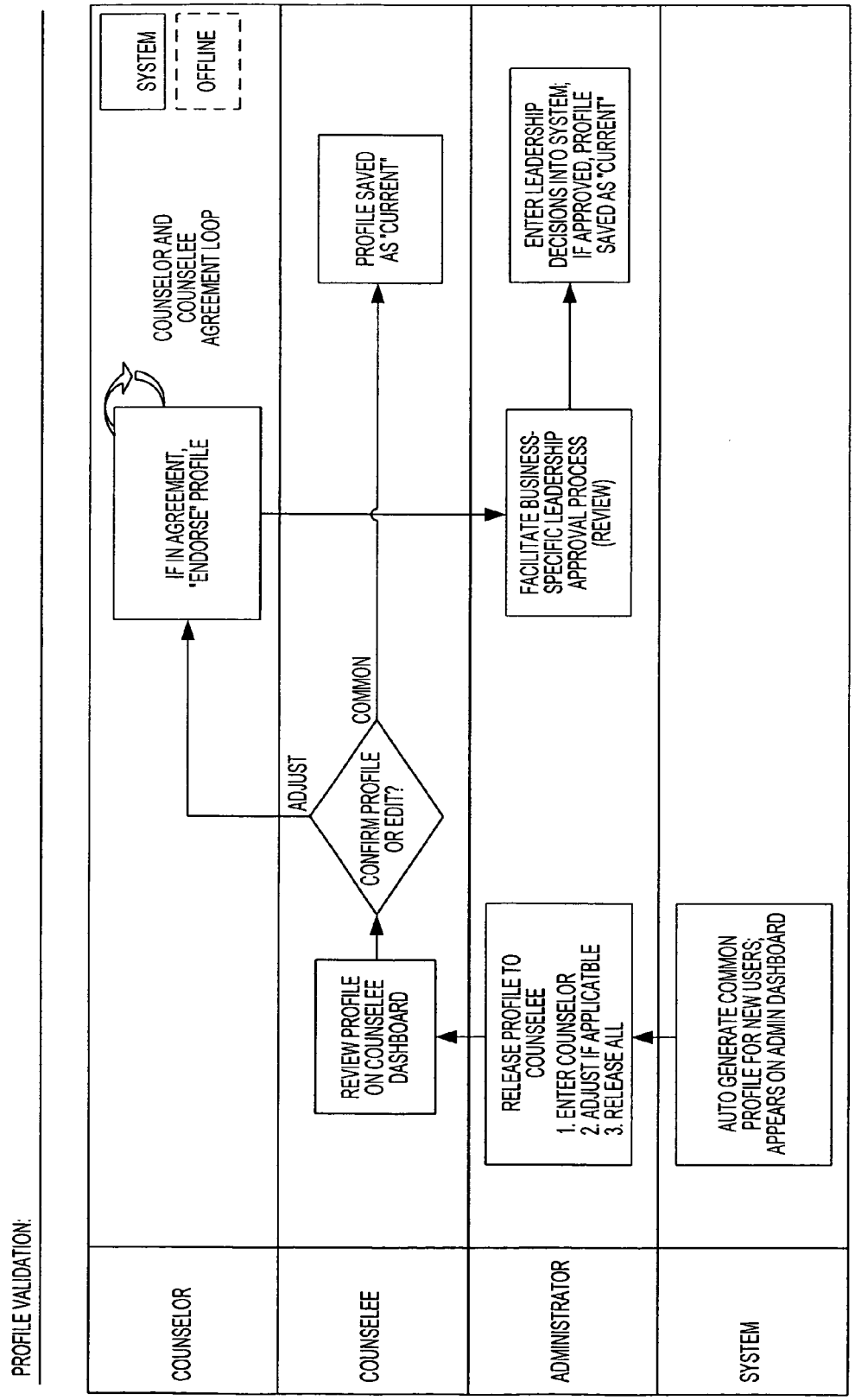

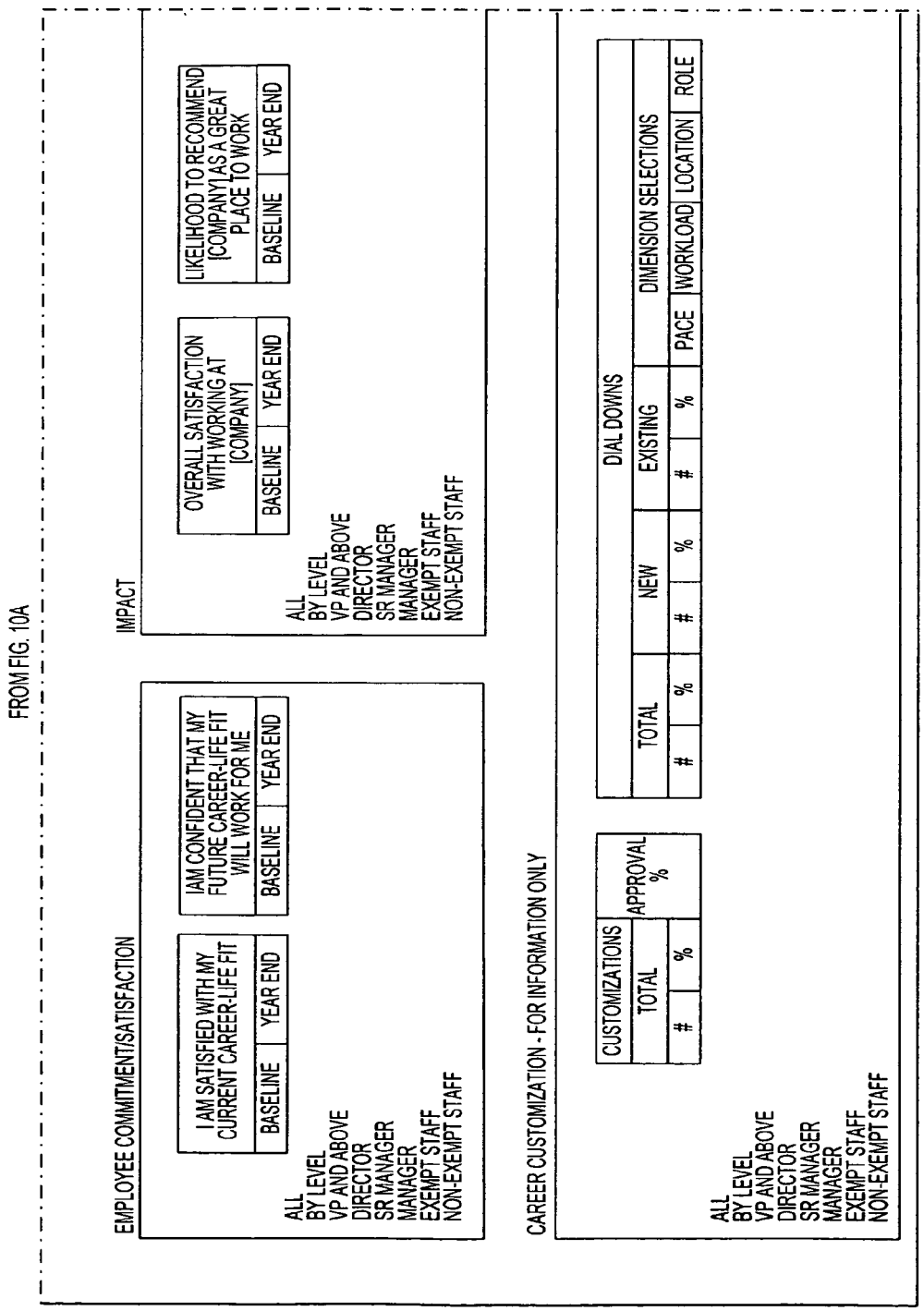

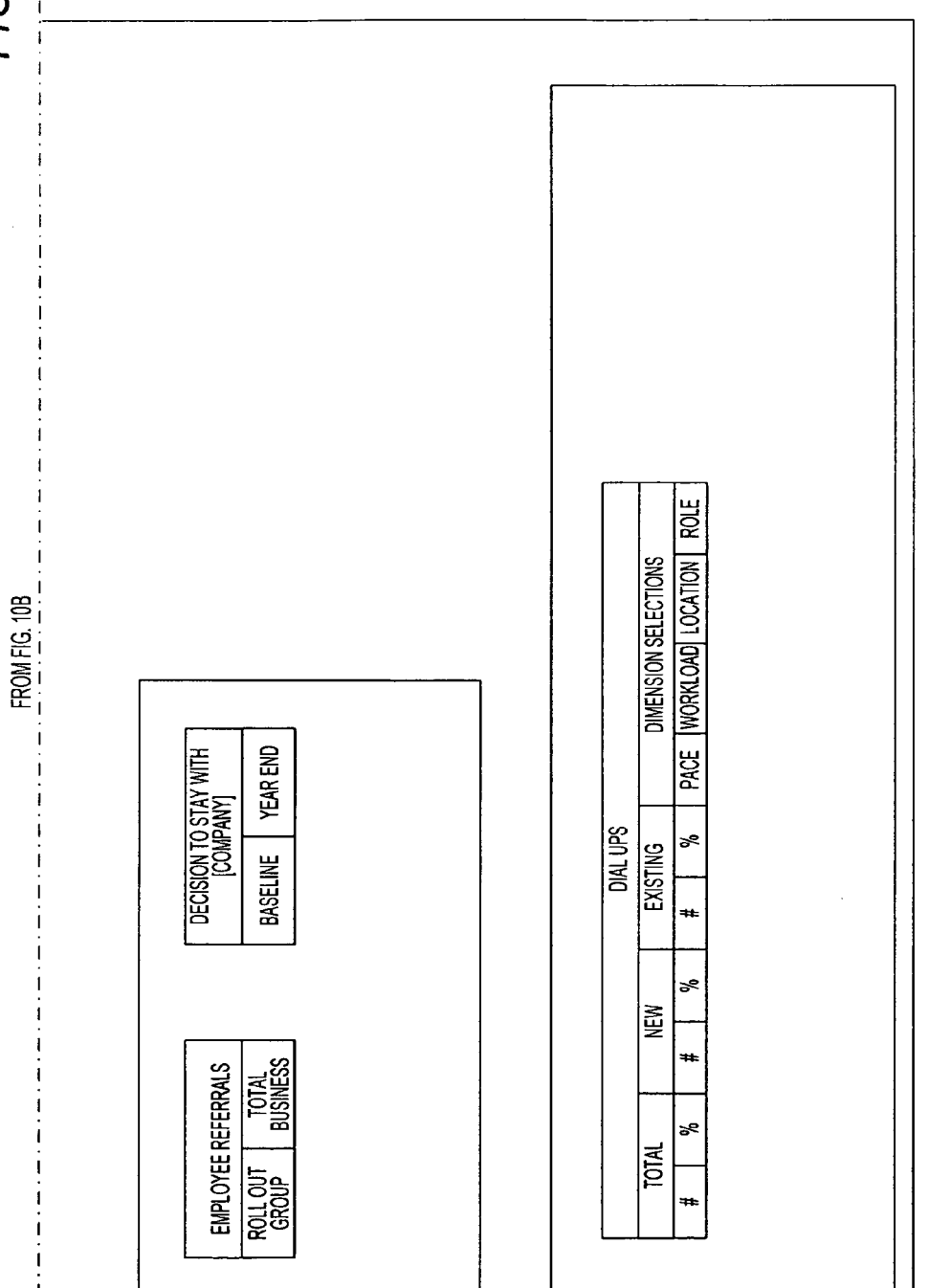

SYSTEM AND METHOD FOR CUSTOMIZING CAREER PATHS

CROSS REFERENCE TO RELATED PROVISIONAL APPLICATION

This application claims the benefit of U.S. Provisional Patent Application No. 60/993,653 filed on Sep. 12, 2007, the disclosure of which, including without limitation the full text of C. Benko & A. Weisberg, *Mass Career Customization, Aligning The Workplace With Today's Nontraditional Workforce*, Harvard Business School Press (2007), is incorporated herein by reference in its entirety.

COPYRIGHT NOTICE

Portions of the disclosure of this patent document contain materials that are subject to copyright protection. The copyright owner has no objection to the facsimile reproduction of the patent document or patent disclosure as it appears in the U.S. Patent and Trademark Office patent files or records solely for use in connection with consideration of the prosecution of this patent application, but otherwise reserves all copyright rights whatsoever.

FIELD OF THE INVENTION

The present invention generally relates to a new computer-implemented system and method for customizing career development within an organization.

BACKGROUND OF THE INVENTION

The convergence of the following six principal workforce trends requires a coordinated response:

1. Knowledge worker shortfall. The shortfall of knowledge workers will likely increase as demand rises and a number of factors reduce supply. Accelerating retirement of Baby Boomers, lower birth rates, increased competition for skilled workers worldwide, stagnant college graduation rates, and declining competency in basic skills such as writing and math by high school students and even college graduates are all contributing to a talent shortage in the knowledge economy. The Employment Policy Foundation estimates that by 2012 there will be about a six-million-person gap in the U.S. between the number of students graduating from college and the number of workers needed to cover job growth and replace retirees.

2. Changing family structures. Only 17 percent of U.S. households today have a husband who works outside of the home and a wife who does not, down from 63 percent a few generations ago. Other changes, like the decreased rate of marriage, reduced or delayed childbirth among married couples, an increase in single-parent families and in dual-career families, have prompted scholars to declare the "end of the lockstep lifestyle." As a result, fewer and fewer workers have the support system at home upon which the corporate ladder model depends.

3. More better educated women. Women are entering the workforce better educated, on average, than men and therefore better prepared to contribute to knowledge-driven organizations. Nearly 60 percent of all college graduates today are women, and they now matriculate with a higher grade point average and more honors than men. Half of all law students are women, as are nearly half of all medical students, and more than 40 percent of MBAs. More than half of all management jobs today are held by women. The ranks of married women in the workforce have doubled since 1970. Yet, most women do not work continuously full-time throughout their careers, and therefore, do not fit well in the corporate ladder model.

4. Changing expectations of men. Men are spending more time with their families than in past decades. Many have reached a point where preserving or increasing their personal time is more appealing than bigger jobs and more money. Control over their work schedules is a high priority. A 2006 study by the Association of Executive Search Consultants found that 56 percent of senior executives surveyed would strongly consider refusing a promotion if it meant fewer hours available for their personal lives. Studies show, however, that very few men take advantage of paternity leaves or other "flex options" because they believe these benefits are meant only for women and that taking them might harm their careers.

5. Generations X and Y. Defined as those between 18 and 43 years of age, these demographic groups have high expectations for both personal and work lives. They view a career as a personalized path that meets an individual's interests and development goals, and includes many diverse work experiences. They are technologically savvy, adaptable to change, and often eager to adopt nontraditional work methods and schedules. Whether or not all these expectations can or will be met is a fair question, but many workers are not content with the status quo. A poll of workers by the Society for Human Resource Management in 2006 found that 75 percent were looking for a new job; of these, 48 percent wanted better career-development opportunities, while only one-third said higher compensation was their chief objective.

6. Technology. New technologies continue to pave the way for employers and workers to create new options for when, how and where works get done. The explosive growth of broadband has been a major factor in enabling the virtual workplace. In 2000, less than 5 percent of U.S. households had broadband connectivity, but by October 2006 the number had risen to over 76 percent. Other technologies supporting new methods for how and when work gets done include virtual private networks, email, instant and text messaging, cellular phones and video-conferencing. Also, new software applications in business intelligence, business process management and other information management disciplines foster innovation and productivity in the virtual workplace.

These trends, taken together, signal the end of the traditional career path and work pattern. Individualization is now the career approach of choice, and a new organizational structure is needed to make it work.

Despite a workforce that is clamoring for more flexibility, there is mounting evidence that formal flexible work arrangements ("FWAs") are not the answer. For example, even though some ninety percent of law firms offer FWAs, fewer than four percent of all lawyers are actually on those programs. Lawyers cite the career penalty and stigma associated with part-time work as the reason they avoid them. Also, while many Fortune 500 companies have instituted formal flexible work policies to help retain talented women, the turnover rate for women continues to be higher than for men. One of the main reasons women cite is the lack of real flexibility.

Formal flexible work arrangements have not delivered on their potential because they are limited in three ways: reach, scope and concept. In terms of reach, FWAs are narrowly focused solutions that must be negotiated on a case-by-case basis between an individual and his/her employer. This makes them difficult to scale. FWAs are limited in scope because they address only one dimension—schedule—of a person's career. For example, most flexible work policies focus on hours worked per day or days worked per week, but do little to address changing needs over the course of a worker's career. FWAs are limited in concept, positioned as accommodations, and therefore compromises, to the ideal of full-time workers who will do anything to climb the corporate ladder.

But the traditional "ideal" workers are about to retire, and the stresses of the tides going out and the tides coming in are beginning to show. Workers who will make up tomorrow's workforce have very different notions of what they want out of work. While Generation X and Y workers are not slackers, they are also not willing to sacrifice their families and personal lives. They insist on meaningful work and meaningful personal lives. Women, who account for about 50 percent of the professional workforce in the U.S. and 60 percent of the students in U.S. colleges and universities, have long been striving for this very same balance.

Shifts in demographics, values and expectations are changing not only how people look at where, when and how they work, but also how they view careers. Workers want the ability to make reasonable choices about fitting their lives into their work and their work into their lives—both today and as their needs change over the course of their careers. The tradeoffs made in the past will not be so readily accepted in the future. Since the traditional career track is becoming less attractive for the majority, there is a need for a way to implement an adaptable work culture within an organization that is rewarding to both women and men of all current generations, and inviting to future ones.

SUMMARY OF THE INVENTION

The computerized system and method for customizing career paths according to the present invention fill the above-identified need and avoid the disadvantages associated with traditional, one-dimensional work cultures. Generally speaking, the system and method of the present invention provide a cohesive computer-implemented framework by which workers can adapt multiple career dimensions in collaboration with their organizations to fit their ever-changing individual career-life fit requirements and goals.

In accordance with a preferred embodiment of the computer-implemented system and method of the present invention, information concerning a worker is obtained by either or both soliciting input directly from the worker (e.g., via a computer terminal with a user interface) and retrieving the information from one or more existing databases containing such information (e.g., a Human Resources database). The information is then applied to a set of stored rules for defining available options along predefined career dimensions reflective of career-life fit. Based on application of the information to the set of stored rules, a profile is automatically created. If the profile accurately reflects the career-life fit goals of the worker, it is used as the operative profile for the worker until it is appropriate or necessary to change it. If the worker desires to change his/her profile at any time, with the assistance and approval power of a counselor and/or other representative(s) of the worker's employer, the profile is adjusted to reflect the career-life fit goals of the worker within programmed and other parameters that are acceptable to the employer.

The foregoing and other aspects and advantages of the invention will in part be obvious and will in part be apparent from this disclosure and accompanying drawings.

The present invention accordingly comprises the various steps and the relation of one or more of such steps with respect to each of the others, and embodies features of construction, combinations of elements and arrangement of parts which are adapted to effect such steps, all as exemplified in the following detailed disclosure and accompanying drawings, and the scope of the invention will be indicated in the claims.

BRIEF DESCRIPTION OF THE DRAWINGS

For a fuller understanding of the invention, reference is made to the following description, taken in connection with the accompanying drawings, in which:

FIGS. 1B-1E depict exemplary embodiments of profiled career dimensions in accordance with the system and method of the present invention;

Figure 6B:
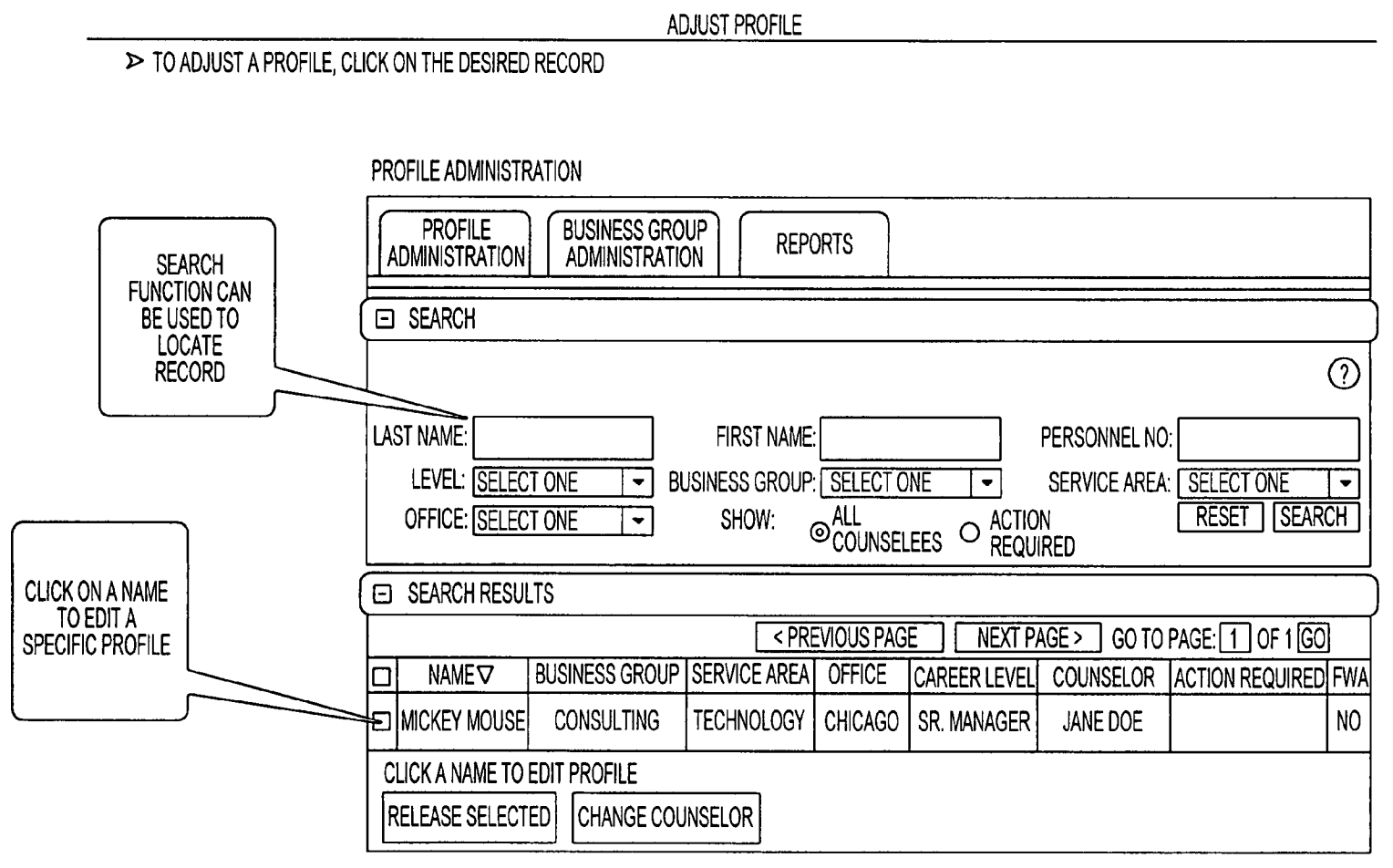

FIGS. 6A-6E are computer screen-shots illustrating use of an exemplary system administration dashboard in accordance with the process depicted in FIGS. 4-5;

FIG. 7 is a computer screen-shot illustrating use of an exemplary worker dashboard in accordance with the process depicted in FIGS. 4-5;

FIGS. 8-8B are computer screen-shots illustrating use of an exemplary counselor dashboard in accordance with the process depicted in FIGS. 4-5;

FIG. 9 is a synoptic view of a profile validation process in accordance with a preferred embodiment of the present invention; and FIGS. 10A-10D depict a computer screen-shot of an exemplary metrics dashboard in accordance with the present invention.

DETAILED DESCRIPTION OF THE PREFERRED EMBODIMENTS

Figure 1A:
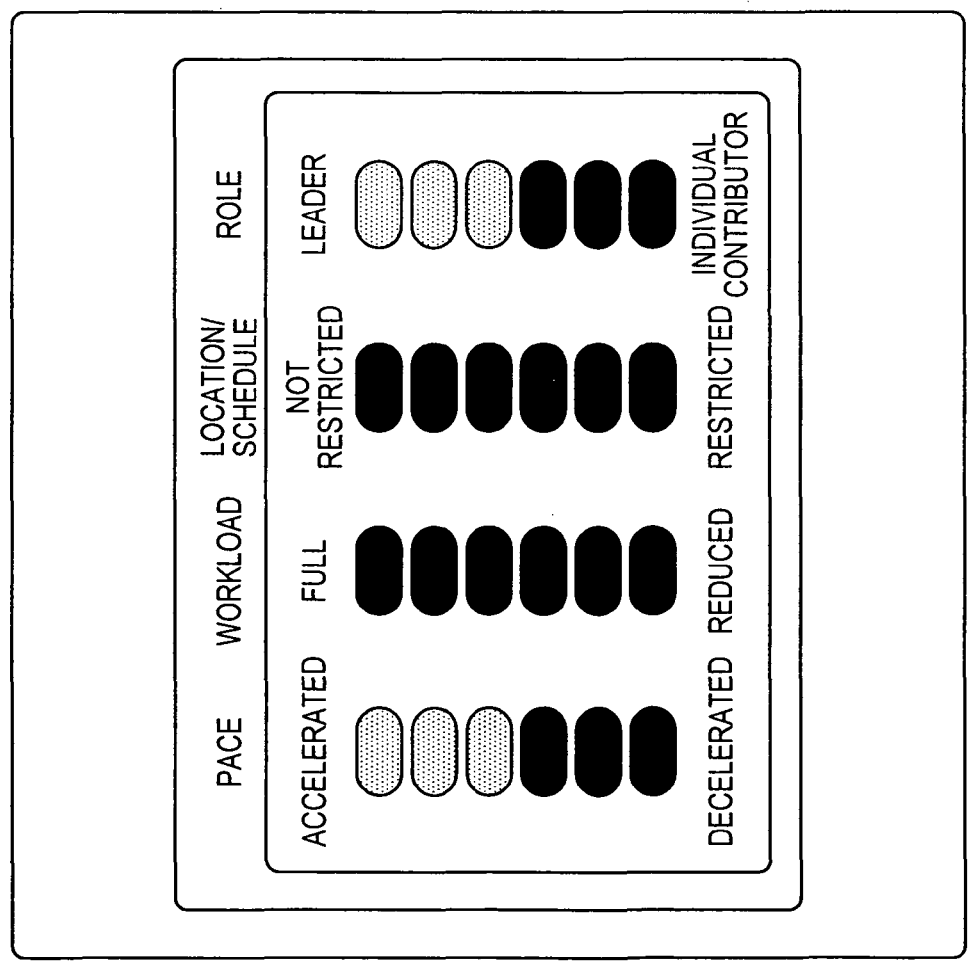
FIG. 1A depicts a preferred embodiment of a profile for capturing/representing choices on career dimensions that most closely match a worker's career-life fit objectives in accordance with the system and method of the present invention.

Although key characteristics of today's workforce—its composition, attitudes and family structures—have changed significantly over the past several decades, the corporate ladder has remained much the same. As a consequence, the ladder model of career progression, built on the assumption of continuous, full time employment does not now fit the majority of knowledge workers. As the traditional track becomes less attractive for the majority, nontraditional career tracks are becoming more appealing. In order to attract and retain talent, corporate leaders must rethink how their organizations offer career choices. The goal being to maintain, if not gain, competitive advantage by providing choices that are rewarding to the most talented men and women of all current generations—and inviting to future ones. To do so, the proverbial corporate ladder evolves into the corporate lattice.

A corporate lattice system encourages a continuous collaboration between employer and worker to design customized career paths, taking into account both the changing needs of the business and workers' changing lives. The result is an adaptive model of career progression that offers workers career-long options for keeping their careers and personal lives in sync and employers the long-term loyalty of their best and brightest.

The system and method for customizing career paths according to embodiments of the present invention enable the evolution from a corporate ladder to corporate lattice culture. The present invention aligns current and future career and life choices for the worker with current and future requirements of the business in ways that are sustainable for both. It provides a model for organizations to respond to the significant long-term trends affecting the talent market. In short, the present invention provides a framework for better aligning the workplace with today's nontraditional workforce.

To date, the most popular corporate response to changes in the workforce, especially the increase of women workers, has been FWAs. In the 1980s, many companies introduced policies such as maternity leave and flexible work schedules that created options to address child care and other family obligations. Throughout the 1990s, these were expanded to include paternity leave and options such as telecommuting. However, from the beginning, FWAs have been positioned as exceptions to the norm. As such, they are not a solution to a corporate-wide problem. Rather, they are accommodations, and therefore are difficult to scale and manage to achieve consistency and effectiveness. The framework provided by the present invention, on the other hand, is a structured response that allows employers and all workers to partner in designing customized career paths. Adoption of a formal, systemic approach to building the corporate lattice through the present invention can create more consistent, scalable benefits.

The present invention provides a structured approach to identify options, make choices and agree on trade-offs to ensure that value is created both for the worker and the employing organization. It lays out a definite set of options along four core dimensions of a career—Pace, Workload, Location/Schedule and Role—as well as associated trade-offs at any point in time or over time.

With the present invention, workers and their managers and/or organizational counselors partner to customize careers by selecting the option along each of the four dimensions that most closely matches the worker's career objectives, keeping in mind their life circumstances and the needs of the business at any given point in time. These choices are captured/represented on a computer profile enabled by the computerized system of the present invention, which is discussed in greater detail hereinafter.

A "common profile" as used herein describes the set of career-life choices across the three dimensions of Pace, Workload and Location/Schedule selected by the majority of workers in an organization at a specific Role level. The profile is common in that it looks similar for many workers—however, it is still customized in that each profile represents a worker's choices at any particular point in time. Most workers will have a common profile at any given point in time. However, over the span of a career, many will select periods when they "dial up" and periods when they "dial down".

As used herein, "dialing up" (or "dial up") refers to a mutually agreed-upon set of choices that can enable a worker to accelerate the acquisition of knowledge, experiences and networks. It can also increase exposure and visibility to leadership. The combination of these benefits may result in accelerated career growth and progression relative to the common profile. "Dialing down" (or "dial down") as used herein refers to a mutually agreed-upon set of choices that generally reflect a contribution that is less than is expected among those having a common profile.

The four career dimensions of Pace, Workload, Location/Schedule and Role are defined below in generalized terms, but can be tailored to align with particular business structures. These dimensions are very much interdependent; a change in one typically will result in adjustments in one or more of the others.

1. Pace (see e.g., FIGS. 1A and 1B): addresses how quickly a worker is slated to develop, grow and progress to increasing levels of responsibility and authority. Progression typically is signaled by formal promotion from one level to the next. Pace is the dimension that most directly incorporates the element of time. This dimension provides choices to dial up or dial down the rate of career growth and progression. Pace impacts the rate at which the foundation of a person's career (experience and capabilities) are planned to be developed. Actual or realized pace results from demonstrated, sustained performance.

2. Workload (see e.g., FIGS. 1A and 1C): addresses the quantity of work performed, typically measured in units of hours or days per week, pay cycle, month or even year. Dialing up or dialing down the Workload dimension can impact compensation and some employer-provided benefits.

3. Location/Schedule (see e.g., FIGS. 1A, 1D and $1D_1$-$1D_3$): where work gets done (location) and when work gets done (schedule) are combined in this career dimension. Together, they define much of the day-to-day experience of how work gets done. At a more granular level, as illustrated in FIGS. 1D and $1D_1$-$1D_3$, the Location/Schedule dimension can alternatively be viewed as the aggregate of three sub-continuums—namely, travel, work location and schedule.

4. Role (see e.g., FIGS. 1A and 1E (law firm example)): refers to the category of a worker's position, job description and responsibilities.

Figure 1D:
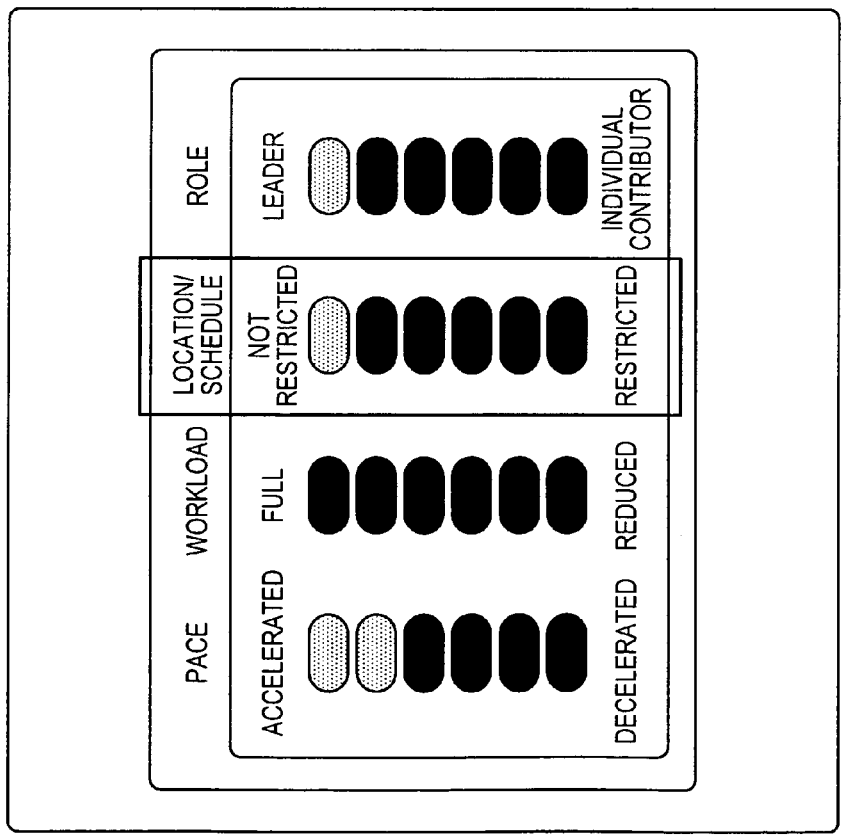

As illustrated in FIG. 1A, an example of a profile according to a preferred embodiment of the present invention represents each of the four career dimensions as a continuum marked by two endpoints. For example, on the Workload dimension, the continuum has one endpoint representing a full workload; the other endpoint represents a reduced workload. Between endpoints are dots which indicate where an individual worker falls along a dimension's continuum.

Typically, in the common profile, the Pace dimension is set at four filled dots extending upwardly from the bottom of the continuum of dots (indicating a typical track toward promotion); the Workload dimension is set at six filled dots (representing a full workload); and the Location/Schedule dimension is set at five filled dots (which generally indicates that the worker can work when and where needed as required by his/her Role). The Role dimension is typically set at three filled dots (indicating a typical positional level of responsibility), but, it should be appreciated that the dot level varies by the worker's level in the organization. Also, it should be understood that an employer-organization can define the common profile differently, as it sees fit.

The exemplary profile depicted in FIG. 1A (of the type generated in accordance with an embodiment of the inventive system and method discussed in greater detail hereinafter) describes career-life choices at one point in time in a typical worker's career. The setting in the Pace dimension is near the center, indicating a somewhat less than common track toward promotion. The worker is working full-time with no restrictions, meaning that the worker travels whenever necessary and without any limit on work location. Accordingly, Workload is set at "Full", and Location/Schedule is set at "Not Restricted". The setting for Role at three filled dots (four nodes from the top of the continuum), signals that the worker has a mid-level position such as, for example, manager (corporation), or special counsel (law firm).

Again, the profile can be adjusted over time; that is, it allows workers to adjust their activities along the four dimensions to optimize their career paths at varying life/career stages (dialing up or down). The goal is to calibrate the choices to the desired mix as personal and career situations evolve.

The profile serves as a baseline for an on-going dialog between the worker and employer (via counselor, engagement management or other employer representative) regarding current and future career-life choices and fit. Indeed, the profile (whether "common" or "dialed up" or "dialed down") is representative of an arrangement that needs to work for both the individual worker and the employing organization.

Figure 1E:
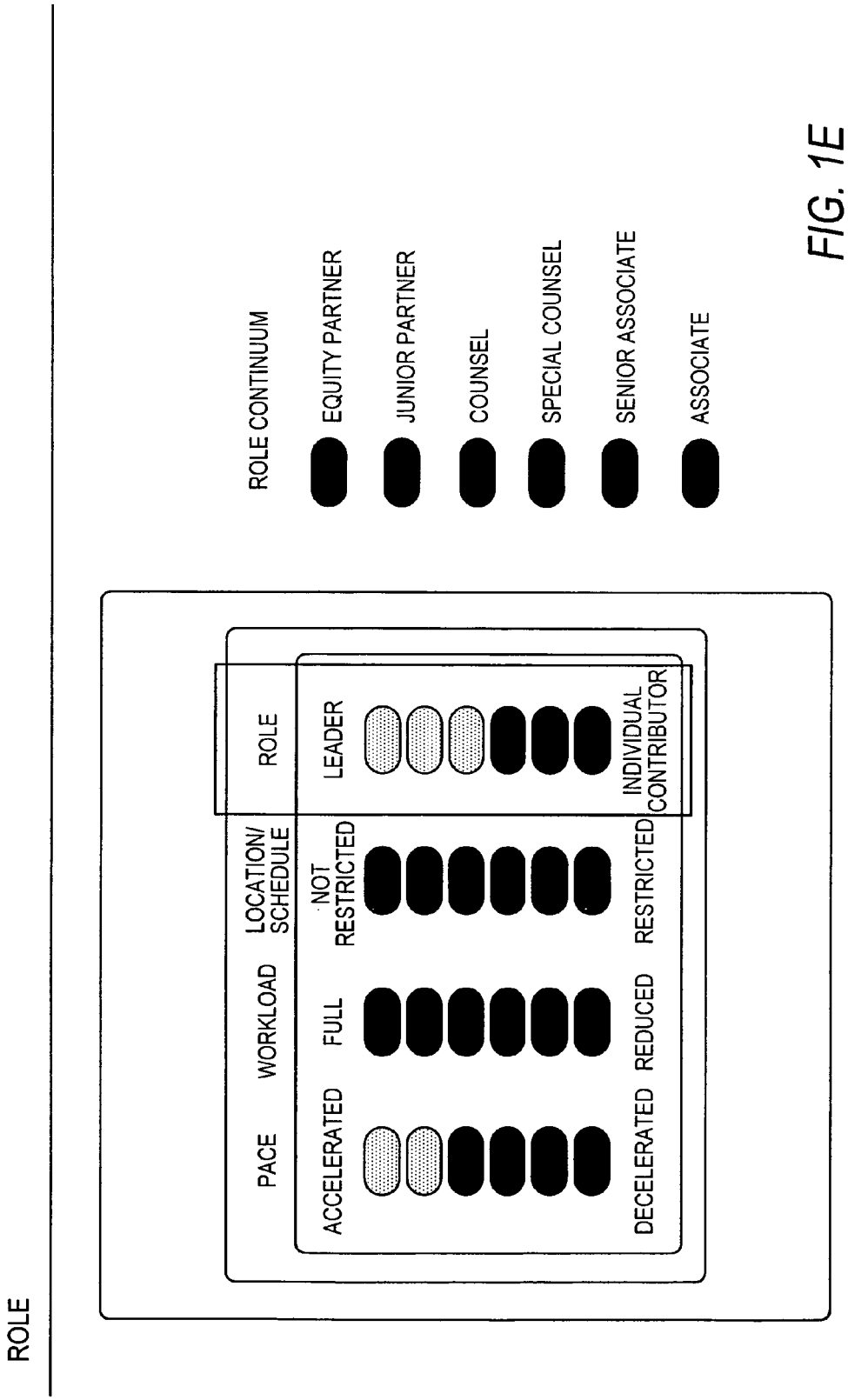

It is anticipated that, at any given point in time, the majority of workers in any organization will have a profile much like the one shown in FIG. 1E. However, over time, a variation from this common engagement level for some amount of time can be expected, illustrating a sine wave-like pattern of rising and falling phases. To visualize how an individual's profile can evolve over time, consider the example depicted in FIG. 2 of a twenty year career mapped in five stages.

Figure 2:
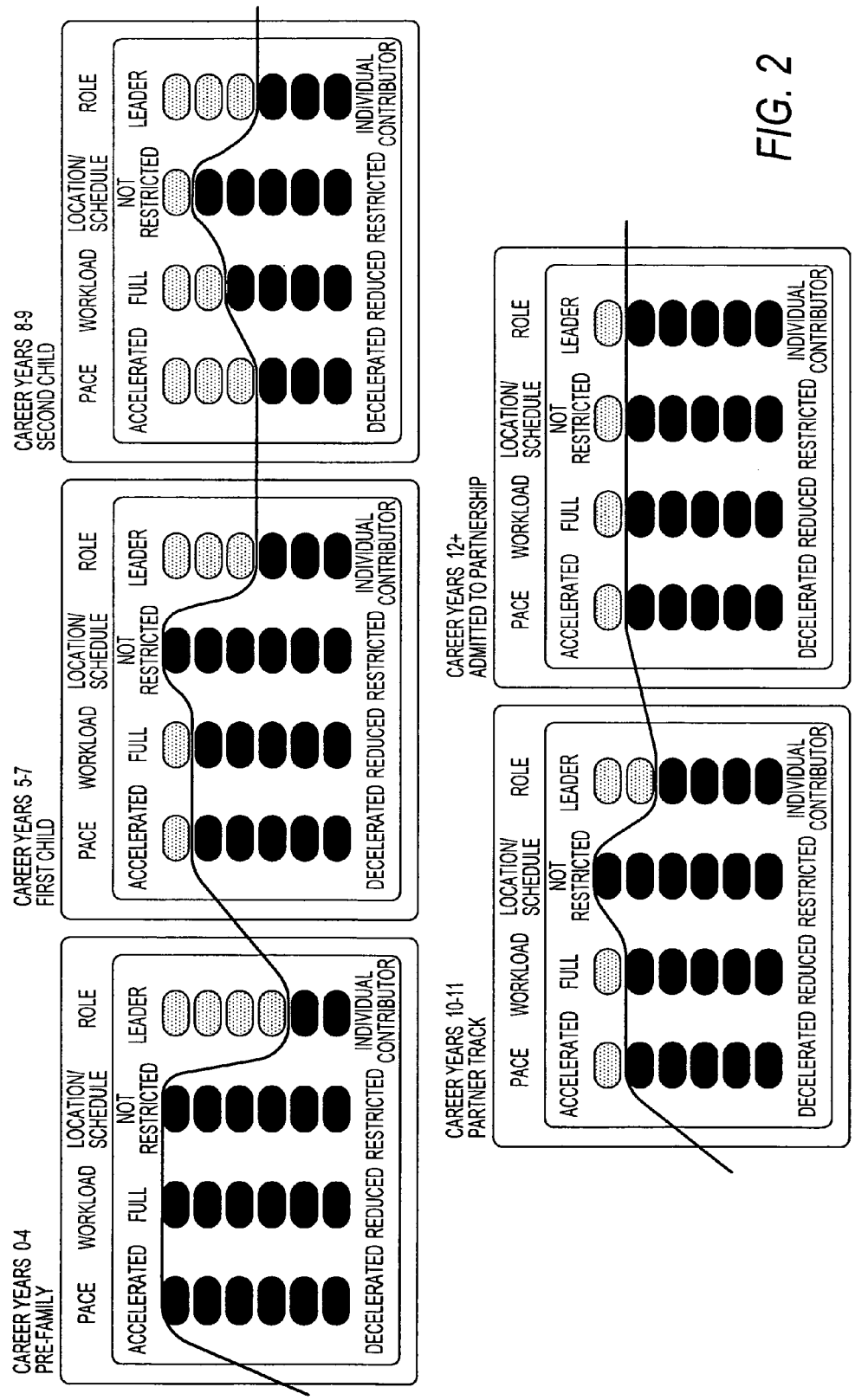
FIG. 2 depicts an example of a twenty year career mapped in five stages in accordance with an embodiment of the system and method of the present invention.

Referring to the example depicted in FIG. 2, the first profile is of the worker when he/she was hired into a fast-track program out of business school. The settings reflect an accelerated pace toward promotion, full workload and unrestricted travel and schedule activity. However, in the second stage, events at home made it necessary for this worker to make changes on the Pace, Workload, and Location/Schedule dimensions. In the third stage, demands at home required a second deceleration. In the fourth stage, the worker was ready to accelerate again. Thereafter, in the fifth stage, while restricting travel to some degree, the worker maintained accelerated levels.

This illustrative career-life history shows how the present invention can provide real options as workers adjust the dials at varying intervals to achieve an optimal career-life fit, staying continuously engaged with the business. Having options gives workers confidence and comfort that they will have the ability to customize their engagement levels with their employers as priorities change over time. Providing this option value gives employers a competitive advantage in attracting talent and is a powerful retention tool. With the inventive approach, organizations will not say "I want only your good years, or the years in which you can make a maximum contribution." Rather, organizations will say "We'd like a long-term arrangement with you. We know that some years you will be giving more and some years you will be giving less. But that's fine as long as we can plot this in a way that works and makes sense for both of us." This is a very new approach to worker retention.

Movement in both directions (dialing up and down) along each dimension is enabled. Also, consideration is given to accommodating ways for talented people to leave an organization (and the workplace generally) for periods, with subsequent re-entry into the organization.

Workers might misinterpret the system and method according to the present invention as creating an entitlement program, with a license to set their own rules without consultation or consideration of business requirements. To the contrary, the present invention is an enabler. It enables careers in multiple ways, including opening up new possibilities about how careers are created and sustained, and making transparent both choices and associated trade-offs.

Applying the system and method according to the present invention requires abandoning the notion that nontraditional career paths are based on one-off exceptions. To encourage this, the invention desirably can be integrated into various talent-management processes. Some of the most critical integration points are with goal-setting, performance management, compensation and benefits, and succession planning systems. Workforce planning, scheduling/deployment, and training and development are some other notable points of intersection.

Preferably, metrics for tracking how well the present invention is taking hold in an organization are also provided. One gauge, for example, can be improvement in the level of commitment by workers. Others can be, for example, retention rates among top performers and declines in recruiting costs.

Desirably, surveys are distributed periodically (preferably, two to three times per year, and preferably customized to the various participants in the inventive system and method) to solicit baseline and mid-point and/or year-end feedback regarding both the inventive system and method (e.g., its utility) as well as the workers' career-life fit (e.g., how workers rank the importance of factors in the career-life fit).

The system and method according to the present invention can be implemented using a related combination of automated interfaces and manual processes. It should be appreciated, however, that greater use of automated processing and a wider range of features with multiple executions is also contemplated by the present invention.

Figure 3:
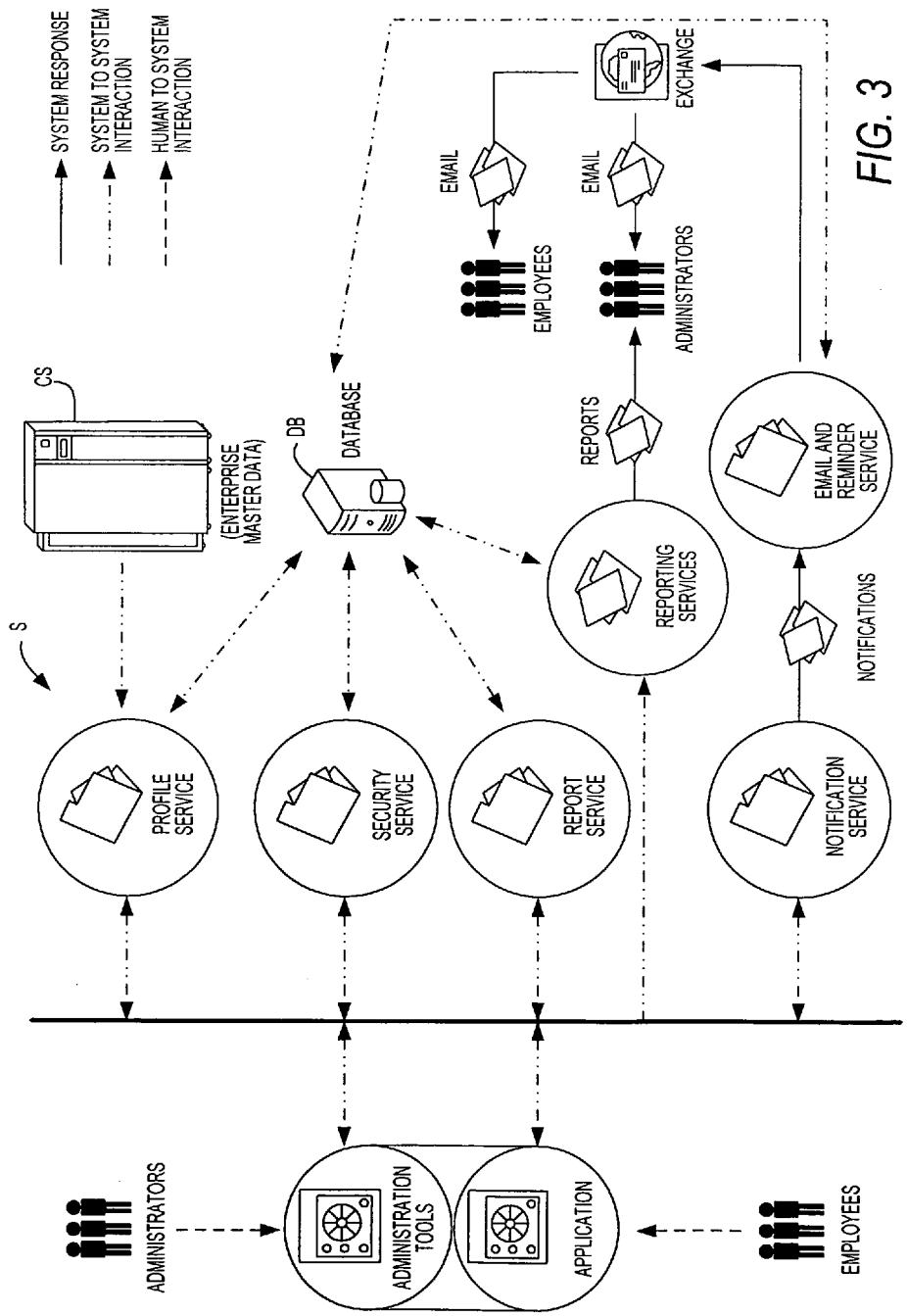
FIG. 3 is a schematic illustration of a preferred embodiment of a system which includes the component elements and means to effect and control the various career path customization processes according to the present invention.

FIG. 3 is a simplified schematic illustration of a system generally indicated as reference S, which includes component elements and means to effect and control the various processes according to the present invention as described herein. Desirably, and where appropriate, system S utilizes state of the art computer capabilities, both hardware and software, and electronic communications links, for example, to display profiles to a user and to receive and process, in real time, information input by the user.

For example, system S preferably includes a computer server CS, and provides access to one or more databases DB. Server CS operates under the control of computer software to carry out the inventive process steps described in greater detail hereinafter. The computer software can include sets of software objects and/or program elements collectively having the ability to execute independently in a separate thread or logical chain of process execution, while permitting the flow of data inputs therebetween. Each can be executed as a separate logical server or using a separate physical device, however, server CS preferably operates as a single logical server.

Server CS is electronically coupled to user interfaces including conventional input and display devices (not shown in FIG. 3). The user interfaces can include remote interfaces coupled to the server via a computer network. A common example of such a network is an intranet.

Users of the inventive system include workers and employer administrators as indicated in FIG. 3. Although not shown in FIG. 3 in the interest of simplicity, it will be appreciated, however, that use of the inventive system is not limited to workers (who are customizing their career paths) and system administrators—for example, counselors, performance managers, organizational leadership, human resources and technology support personnel to name a few are also contemplated users of the inventive system.

More particularly, for the worker who is using the inventive system S to customize his/her career path, the system preferably provides access to dimension and level information for an accurate, up-to-date view of the worker's profile. The system also can provide access to prior profiles and common profile detail, as well as the capability to view possible future career profile changes. Additionally, the worker can have access to instructions, guidelines, worksheets, process information and information concerning career profile trade-offs to assist in use of the inventive system and method; links to other programs can also be provided.

For the other contemplated users of the inventive system, access to the foregoing functionality as well as additional functionality can be provided. Such additional functionality can variously include the capability to access and run reports concerning: (i) profiles of direct reports (useful to managers, for example); (ii) worker profiles compared against common profiles or against performance data (also useful to managers and organizational leadership, for example); and (iii) profiles across organizational units, e.g., by department, (useful to leadership, for example). The additional system functionality can also provide control over (i) interfaces to other human resources type systems (useful to Human Resources personnel, for example); and (ii) security and access and system management (useful for technology support personnel, for example).

Although functionally distinct, it should be understood that the various functions of the inventive system preferably overlap when it comes to the flow of data inputs therethrough in order to avoid requiring entry of the same core data more than once. For example, information input by the worker, counselor or administrator, for example, and used by system S to design a customized career path as described in greater detail hereinafter can be used to populate reports with individual or aggregated data for generation by the system, e.g., metrics.

Utilization of the inventive system by a worker-user begins with the retrieval of an existing profile or the creation of a new profile. Preferably, the user accesses the inventive system using a web browser interface to the employer-organization's intranet—subject to security provisions.

Figure 4:
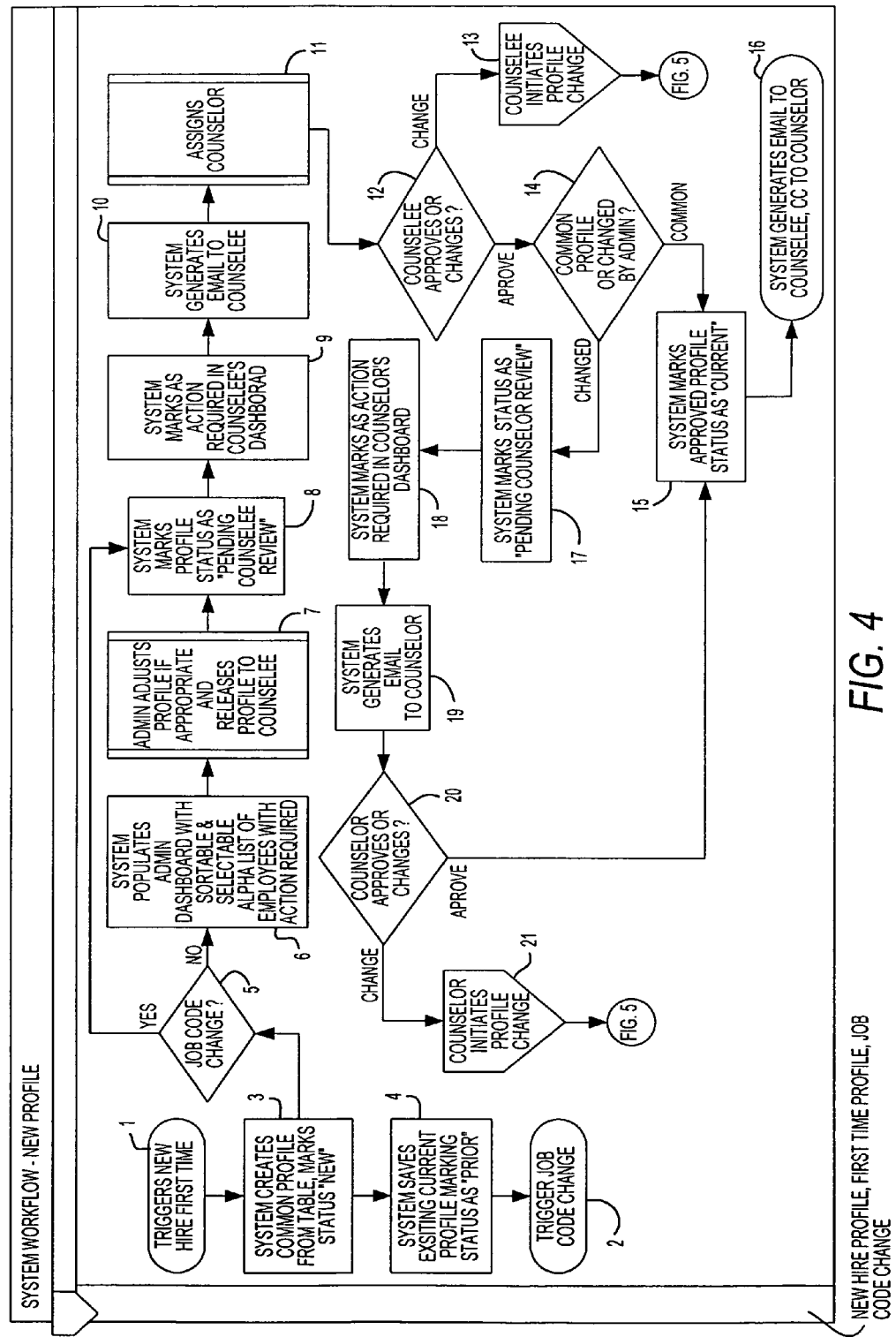
FIG. 4 depicts a preferred embodiment of a computer-implemented process for creating a profile in the system according to the present invention.

Referring now to FIG. 4 which depicts a preferred embodiment of a computer-implemented process for creating a new profile according to the present invention, when the user accesses the inventive system for the first time (event 1), or, optionally, when the access comes after the worker has newly changed jobs within the organization, e.g., a promotion, (event 2), the system automatically creates a common profile for the worker (step 3). For the worker who has changed jobs within the organization, any existing current profile for the worker residing on the system is desirably now saved as a "prior" profile (step 4) (it should be appreciated, however, that an organization may decide not to revert to a common profile in the event of a job change, but, rather, to program the system to automatically provide an updated individualized profile reflective of the worker's new position). Based on only the login information provided, the system automatically retrieves applicable/relevant individualized data concerning the worker from Human Resources and/or other accessible databases/sources containing such information to populate the common profile in accordance with preselected parameters.

The inventive system stores and each profile can be subject to all the career customization choices available generally to all workers. The system, however, is preferably rules-based—that is, eligibility or other rules for customization are stored in the system and, based on the user information, only customization opportunities that are available to the particular individual worker-user in accordance with the employing organization's rules are included in such worker's profile (common or otherwise). For example, if workers are required to have been employed by the employing organization for a minimum time period (e.g., two years) before they are eligible to fully customize their career paths using the inventive system, appropriate constraints will automatically be reflected in the profiles created for workers who do not satisfy the minimum tenure requirement.

Preferably, the interdependency among profile dimensions is also a programmed part of the rules so that if a worker dials up/down in a given dimension, those other dimensions that are affected thereby are automatically filled or adjusted as a consequence.

Still referring to FIG. 4, in the case of a first time user access (decision 5—NO), an administration dashboard is automatically updated with appropriate information reflecting the worker's inclusion in the system (step 6). Computer screen-shots illustrating use of an exemplary administration dashboard are depicted in FIGS. 6A-6E. The profile can then be adjusted by the employing organization's system administration function if necessary and as appropriate, and released (e.g., displayed, transmitted) to the worker (FIG. 4, step 7) (e.g., by selecting dots on the profile dimension continua and preferably inputting appropriate text notations in a comment field, and by selecting a release profile button; see FIGS. 6B-6C). Desirably, profiles can be released individually or in batches. The system also automatically marks the profile status as pending for worker review (FIG. 4, step 8). In the case of an internal job change (decision 5—YES), the system moves directly to step 8, bypassing steps 6 and 7.

Automatically marking in the worker's dashboard that action is required (step 9), the system desirably also generates an automatic notification (e.g., email) to the worker (step 10). A computer screen-shot of an exemplary worker dashboard is depicted in FIG. 7. Preferably, by this juncture, a counselor will have been assigned (see FIGS. 6E-6E) with whom the worker consults in connection with career customization issues (step 11). The counselor is someone employed or retained by the worker's organization and is responsible for helping the individual worker manage his/her career-life fit within the organization.

It is then up to the worker (preferably, with the benefit of the guidance/participation of his/her assigned counselor) to either submit the profile presented (e.g., by selecting a submit button—see FIG. 7) or to propose changes thereto (FIG. 4, decision 12) (e.g., by selecting the desired dots on the profile dimension continua, preferably inputting comments in a comment field (e.g., how goals will change, etc.) and selecting a propose new profile button—see FIG. 7). If the worker opts to change the profile, the process followed (FIG. 4, step 13) is as set forth in FIG. 5 discussed below; if the worker opts to accept the current profile, the system automatically determines if the current profile is the common profile or a profile that has otherwise been adjusted by the system administration function (FIG. 4, decision 14).

If the accepted profile is the common profile automatically generated by the system, it is now recognized by the system as the current profile (step 15), and notification to this effect is automatically provided to the worker and, desirably, the worker's assigned counselor as well (step 16). It should be appreciated that the common profile is a starting point—it is not written in stone. Nor is it an indicator that there is nothing for the worker to discuss with his/her counselor, manager or other employer representative.

Figure 5:
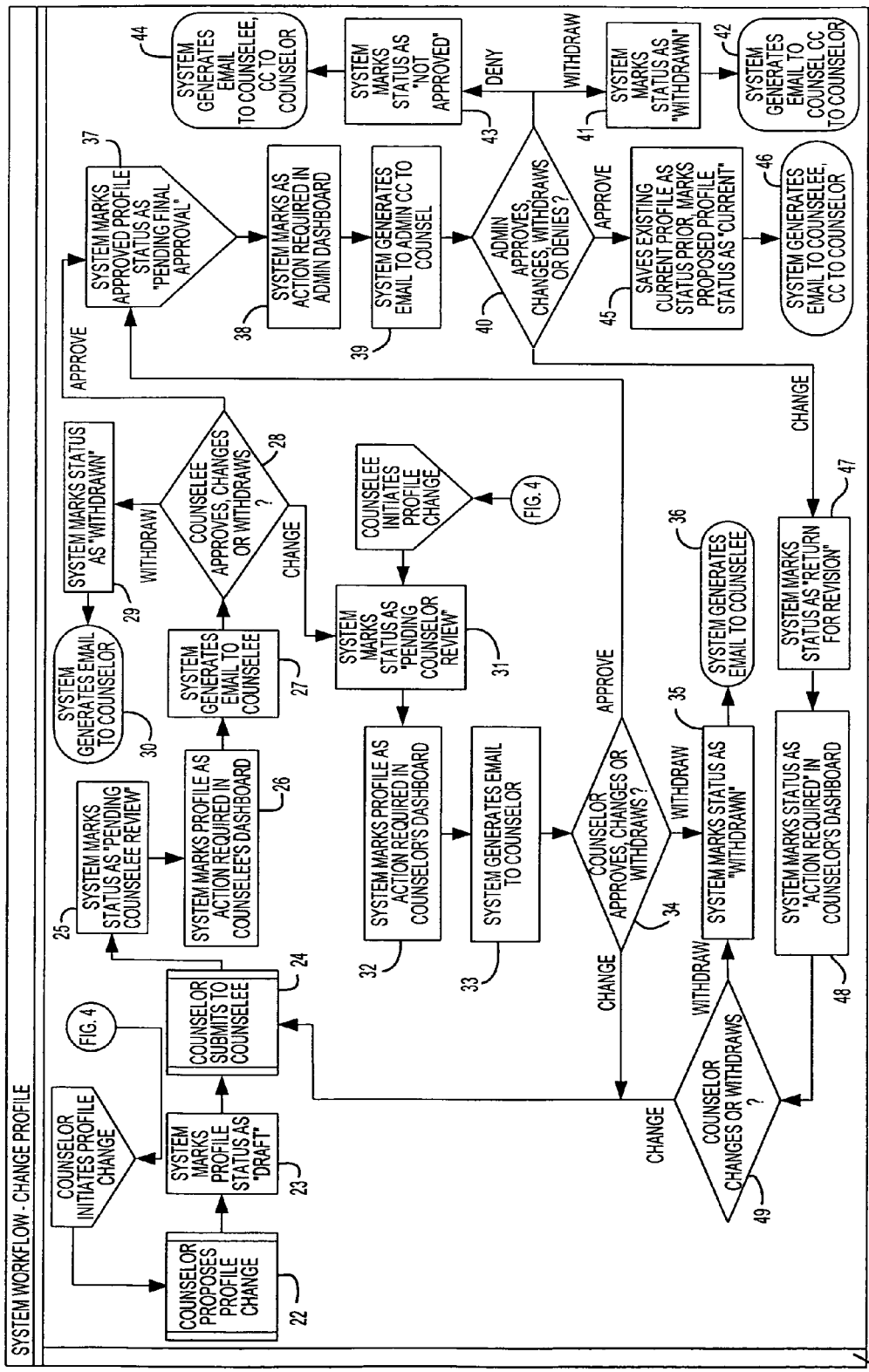
FIG. 5 depicts a preferred embodiment of a computer-implemented process for changing a profile in the system according to the present invention.
Figure 10A:
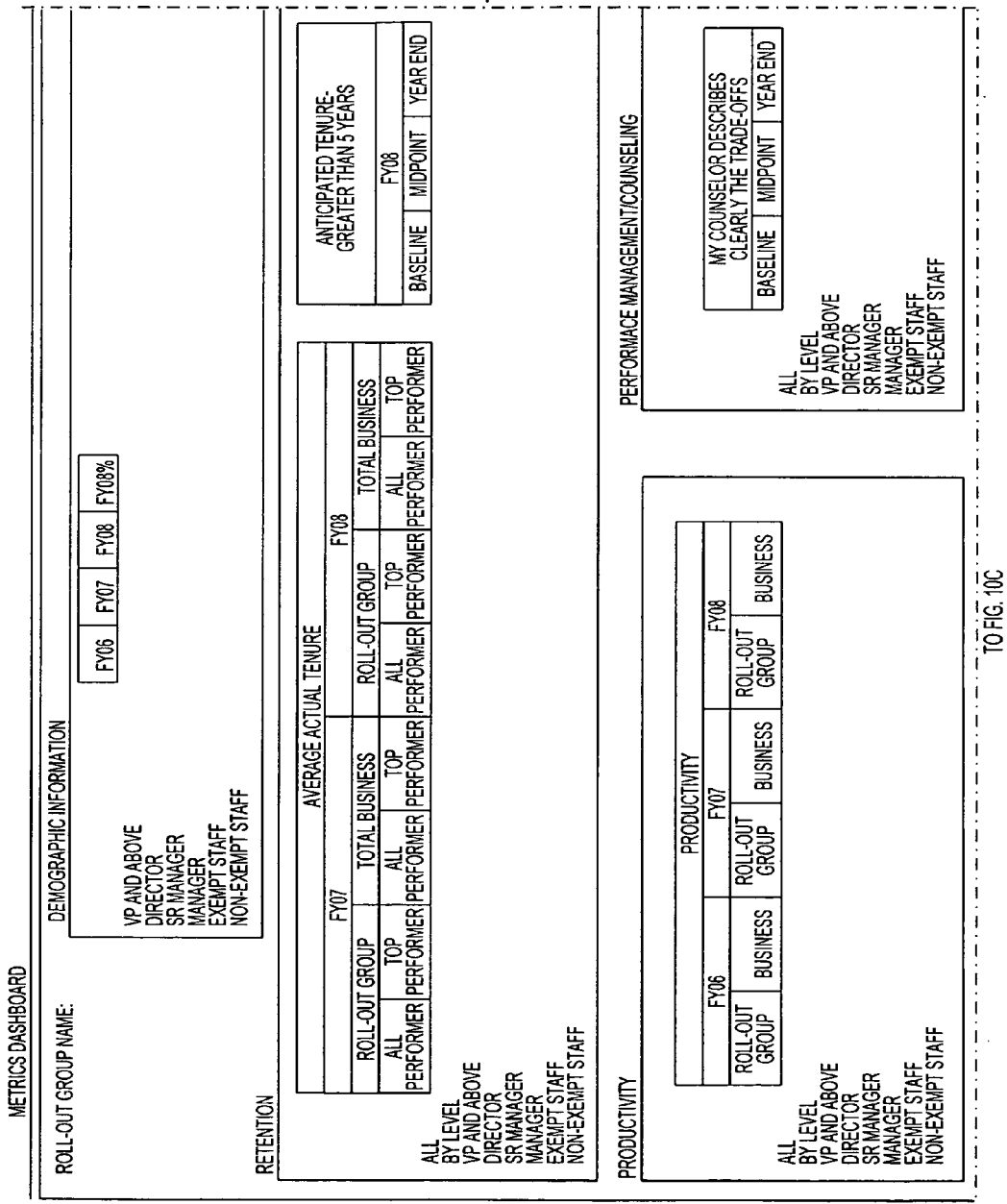
Figure 10B:
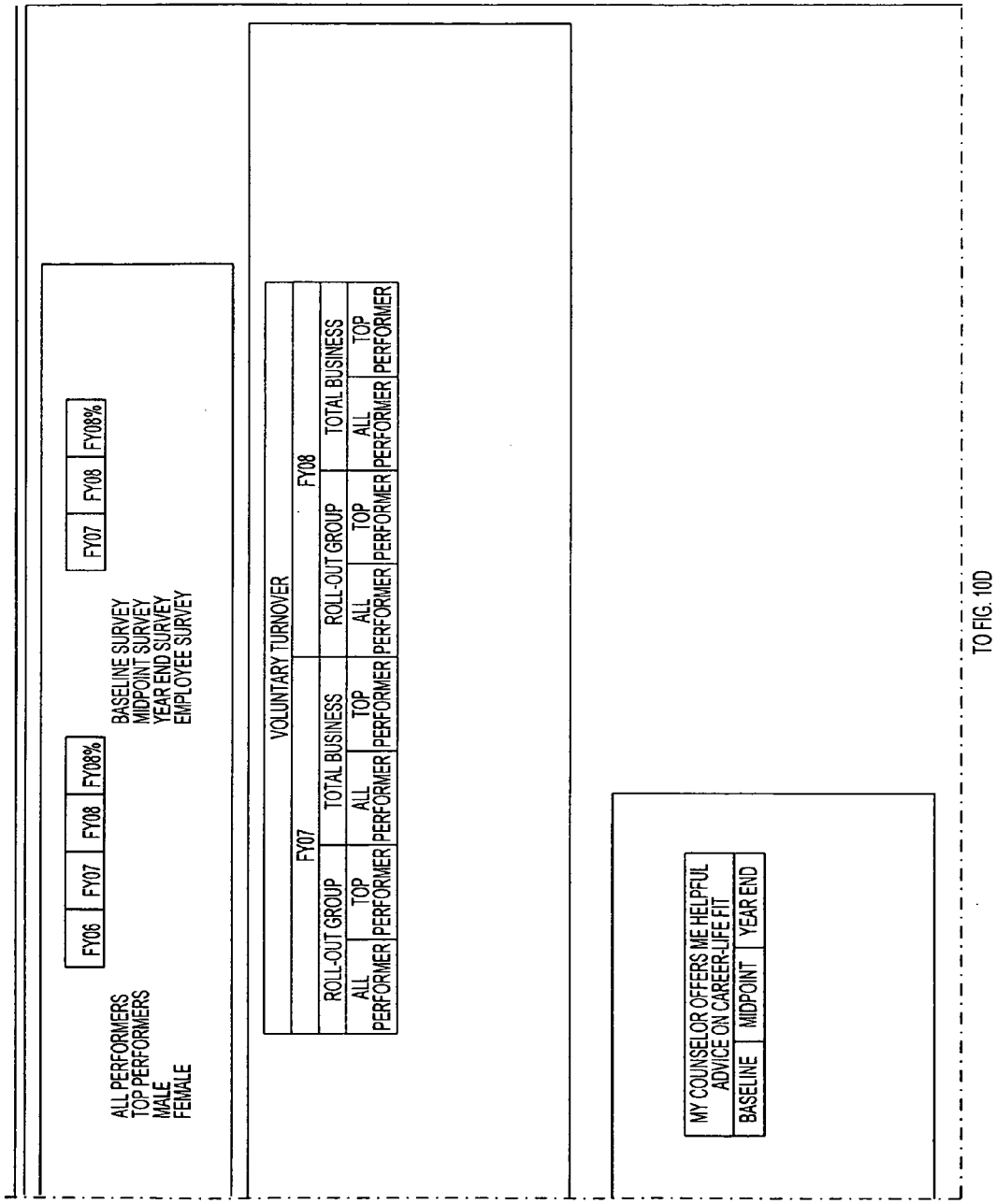

If the accepted profile is one that was adjusted by the system administration function, it is marked as pending counselor review (step 17), action required by the counselor (step 18), and, upon notification (step 19), the counselor either approves the adjusted profile (decision 20—APPROVE) (e.g., by selecting an endorse profile button—see FIG. 8A), whereby step 15 is effected, or the counselor initiates changes (decision 20—CHANGE) (e.g., by selecting the desired dots on the profile dimension continua, noting comments in a comment field and selecting a return for review button—see FIG. 8B) following the process set forth in FIG. 5 (FIG. 4, step 21). Computer screen-shots illustrating use of an exemplary counselor dashboard are depicted in FIGS. 8A-8B.

FIG. 5 depicts a preferred embodiment of a computer-implemented process for effecting a profile change in the system according to the present invention—both as initiated by a worker-user (step 13 in FIG. 4) and by a counselor (step 21 in FIG. 4).

In the case where a profile change is initiated by a counselor, the changed profile proposed by the counselor (step 22) is automatically marked by the inventive system as a draft (step 23) and submitted to the worker (step 24). Marked as pending worker review (step 25), and action required by the worker in the worker's dashboard (step 26), the system otherwise generates a notification to the worker (step 27). It is then up to the worker to submit, change or withdraw the draft profile (decision 28).

When the worker withdraws the draft profile (decision 28—WITHDRAW) (e.g., by selecting a cancel button—see FIG. 7), the system automatically marks the withdrawn status (step 29) and notifies the counselor (step 30).

When the draft profile proposed by the counselor is further changed by the worker (decision 28—CHANGE), or when a profile change is initiated by the worker (step 13 in FIG. 4), the system automatically marks the changed profile as pending counselor review (step 31), action required in the assigned counselor's dashboard (step 32), and otherwise notifies the counselor (step 33). The counselor either approves the changed profile (decision 34—APPROVE), withdraws it (decision 34—WITHDRAW) (e.g., by selecting the appropriate endorse profile or cancel buttons presented—see FIG. 8B) or proposes a further changed profile (decision 34—CHANGE) (e.g., by selecting the desired dots on the profile dimension continua, noting comments in a comment field and selecting a return for review button—see FIG. 8B).

When the counselor withdraws the changed profile, the system automatically marks the withdrawn status (step 35) and notifies the worker (step 36). A further changed profile proposal by the counselor is implemented by effecting (revisiting) step 24. Approval, by the counselor, of the worker's proposed changed profile (decision 34—APPROVE) intersects (at step 37) with the worker's approval of a counselor-initiated changed profile (decision 28—APPROVE).

At step 37, the system automatically marks the changed profile as pending final approval, and action required in the system administration dashboard (step 38), and otherwise notifies both the system administration function and the counselor (step 39). It is then up to the system administration function to approve, change, withdraw or deny the changed profile (decision 40).

When the administration function withdraws the changed profile (decision 40—WITHDRAW), the system automatically marks the withdrawn status (step 41) and notifies the worker and counselor (step 42). When the administration function denies the changed profile (decision 40—DENY), the system automatically marks the status as not approved (step 43) and notifies the worker and counselor (step 44).

Approval, by the system administration function, of the changed profile (decision 40—APPROVE) results in the changed profile being automatically saved as the current profile (step 45). The worker and counselor are also notified of the approval (step 46).

When the administration function opts to further change the changed profile under consideration (decision 40—CHANGE), the system automatically marks the status as being returned for revision (step 47), and action required in the counselor's dashboard (step 48). It is then up to the counselor to change or withdraw the changed profile (decision 49) by either effecting step 24 to change it or effecting step 35 to withdraw it.

As noted above, metrics for tracking how well the inventive system and method is taking hold in an organization can also be collected automatically and periodically by the system and utilized to generate/display a variety of reports. A computer screen-shot of an exemplary metrics dashboard is depicted in FIGS. 10A-10D.

FIG. 9 provides a synoptic view of the inventive process discussed above—more particularly illustrating the roles of the various participants. As indicated in FIG. 9, starting at the system level, and focusing on the roles of the participants, the common profile is automatically created (or retrieval of an existing profile is permitted) upon login by the worker-user.

The system administration function, which, generally speaking, tracks and manages requests and endorsements to dial-up and/or dial-down, enters any system administration generated profile adjustments (and can enter a counselor assignment), and releases the profile to the worker (individually, or as part of a batch release). The system administration function also, at a later point in the process, initiates a business-specific review and approval sub-process when a dial-up/dial-down request is ultimately agreed to and endorsed by the worker and his/her counselor, with organizational leadership decisions being entered into the system and the profile being saved as the current profile. The system administration function can also run various reports as needed.

Upon release of the profile by the system administration function to the worker's dashboard early on in the process, the worker either submits the profile as presented or edits it. The counselor reviews edited profiles (i.e., requests to dial-up and/or dial-down), and, based on an iterative system (and human) interaction between the counselor and the worker, either further edits the profile or endorses it.

According to an alternative embodiment of the present invention, a career-life history represented by a series of one or more profiles (see e.g., FIG. 2) can be generated to better inform the career-life fit planning process. This can be accomplished by first inputting the worker-user's basic information (e.g., gender, the number of years the worker has been in the workforce, the industry in which the worker has been most active). Then, preferably, the worker is prompted to label and identify by role each significant career-life stage he/she has experienced (i.e., the significant inflection points in the worker's career—e.g., job/industry changes, educational milestones, life changes/milestones). Blank profiles setting forth the core career dimension continua are then generated and presented for completion (e.g., by selecting dots on the profile dimension continua) by the user-worker for each significant career stage previously identified by the worker. Once completed, a series of profiles are generated and presented, illustrating a pattern of rising and falling phases, which are representative of the career-life history of the worker. The synoptic view of the evolution of the worker's career-life history provided offers an important additional baseline for the on-going dialog between worker and employer (via counselor, engagement management or other employer representative) regarding current and future career-life choices and fit (based on the premise that one should know where one has been in order to better understand where one is or where one is going).

It should be appreciated that the foregoing alternative embodiment is particularly suited to be offered not only internally within an organization, but externally via a publicly-accessible global computer network such as, for example, the Internet, to provide career-minded people with a visual insight into how they might have tailored their careers and the motivation to explore the benefits of career customization.

It should be appreciated from the foregoing that the present invention is an effective tool for enhancing the frequency, quality and duration of career-life dialogs in an organization. The present invention provides the structure and the permission to discuss career and life goals, conveying the message that the exercise of options is not only acceptable, but encouraged. Moreover, the invention fosters a more collaborative work environment—more emphasis and thought is given to having robust conversations about career, which continue to evolve throughout the course of a career. Furthermore, the present invention improves the transparency about the trade-offs among career choices, making the expectations attendant to common, dialed-up or dialed-down career paths explicit and understandable.

Customizing careers within a corporate lattice offers significant benefits over the traditional corporate ladder. Just as mass product customization improved profitability, reduced costs and increased loyalty, the system and method according to the present invention has the power to inspire greater productivity, reduce the costs of turnover and generate greater loyalty through the collaborative computer-implemented approach to customizing careers that it provides.

In so far as embodiments of the invention described herein are implemented, at least in part, using software controlled programmable processing devices, such as the computer system depicted in FIG. 3, it will be appreciated that one or more computer programs for configuring such programmable devices or system of devices to implement the foregoing described inventive process for customizing career paths are to be considered an aspect of the present invention. The computer programs can be embodied as source code and undergo compilation for implementation on processing devices or a system of devices, or can be embodied as object code, for example. Those of ordinary skill in the art will readily understand that the term computer in its most general sense encompasses programmable devices such as those referred to above, and data processing apparatus, computer systems and the like. Preferably, the computer programs are stored on carrier media in machine or device readable form, for example in solid-state memory or magnetic memory, and processing devices utilize the programs or parts thereof to configure themselves for operation.

It will thus be seen that the objects set forth above, among those made apparent from the preceding description and the accompanying drawings, are efficiently attained and, since certain changes can be made in carrying out the above method and in the constructions set forth for the system without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for customizing a worker's career path within a given organization, the method comprising:
   using a computer to obtain information concerning a worker, the information including current career-life fit objectives of the worker;
   processing the information by the computer in accordance with predefined rules, the predefined rules defining (A) career-life fit customization opportunities available to the worker within the organization including at least an eligibility requirement, and (B) options available to the worker within the organization along predefined career dimensions pertinent to the current career-life fit objectives of the worker, the predefined career dimensions (a) being interdependent including trade-offs, and (b) including at least (i) pace, (ii) workload, (iii) location/schedule, and (iv) role,
      wherein the pace dimension includes the rate of the worker's career growth within the organization, wherein the workload dimension includes the quantity of work performed by the worker for the organization, wherein the location/schedule dimension includes the combination of where and when work is performed by the worker for the organization, and wherein the role dimension includes the worker's responsibilities within the organization;
   based on the processed information, using the computer to automatically generate a career-life fit plan profile for the worker that most closely matches the current career-life fit objectives of the worker while complying with the predefined rules;
   releasing, by the computer, the profile, to the worker for review and at least one of approval and revision in accordance with the current career-life fit objectives of the worker and the predefined rules;
   if the profile is approved by the worker on initial release to the worker, retaining, by the computer, the profile as an operative career-life fit plan for the worker that defines the worker's job parameters within the organization;
   if the profile is not approved by the worker on initial release to the worker and is revised by the worker, releasing, by the computer, the profile as revised to an assigned counselor representing the organization for review and at least one of approval and revision;
   using the computer to iteratively review, revise and release the profile between the counselor and the worker until the profile is approved by both the worker and the counselor; and
   when the profile is approved by both the worker and the counselor, using the computer to retain the profile as the operative career-life fit plan for the worker that defines the worker's job parameters within the organization.

2. The method according to claim 1, wherein the profile represents each of the career dimensions as a continuum of selection points defined between two endpoints, the selection points being selectively selectable.

3. The method according to claim 1, further comprising using the computer to update at least one of an administration and leadership function within the organization with the operative career-life fit plan for the worker.

4. A system for customizing a worker's career path within a given organization, comprising:
   at least one data processing device configured to:
   receive information concerning a worker, the information including current career-life fit objectives of the worker;
   apply the information to preselected rules, the rules defining (A) career-life fit customization opportunities available to the worker within the organization including at least an eligibility requirement, and (B) options available to the worker within the organization along predefined career dimensions pertinent to the current career-life fit objectives of the worker, the predefined career dimensions (a) being interdependent including trade-offs, and (b) including at least (i) pace, (ii) workload, (iii) location/schedule, and (iv) role, wherein the pace dimension includes the rate of the worker's career growth within the organization, wherein the workload dimension includes the quantity of work performed by the worker for the organization, wherein the location/schedule dimension includes the combination of where and when work is performed by the worker for the organization, and wherein the role dimension includes the worker's responsibilities within the organization;

based on application of the information to the rules, automatically generate a career-life fit plan profile for the worker that most closely matches the current career-life fit objectives of the worker while complying with the predefined rules;

release the profile to the worker for review and at least one of approval and revision in accordance with the current career-life fit objectives of the worker and the predefined rules;

retain the profile as an operative career-life fit plan for the worker that defines the worker's job parameters within the organization if the profile is approved by the worker on initial release to the worker;

if the profile is not approved by the worker on initial release to the worker and is revised by the worker, release the profile as revised to an assigned counselor representing the organization for review and at least one of approval and revision;

iteratively review, revise and release the profile between the counselor and the worker until the profile is approved by both the worker and the counselor; and retain the profile as the operative career-life fit plan for the worker that defines the worker's job parameters within the organization when the profile is approved by both the worker and the counselor.

5. The system according to claim 4, wherein the profile represents each of the career dimensions as a continuum of selection points defined between two endpoints, the selection points being selectively selectable.

6. The system according to claim 4, wherein the at least one data processing device is configured to update at least one of an administration and leadership function within the organization with the operative career-life fit plan for the worker.

7. A non-transitory program storage device readable by a machine, the device tangibly embodying a program of instructions executable by the machine to perform a process for customizing a worker's career path within a given organization, comprising:

obtaining information concerning a worker, the information including current career-life fit objectives of the worker;

applying the information to preselected rules defining (A) career-life fit customization opportunities available to the worker within the organization including at least an eligibility requirement, and (B) options available to the worker within the organization along predefined career dimensions pertinent to the current career-life fit objectives of the worker, the predefined career dimensions (a) being interdependent including trade-offs, and (b) including at least (i) pace, (ii) workload, (iii) location/schedule, and (iv) role, wherein the pace dimension includes the rate of the worker's career growth within the organization, wherein the workload dimension includes the quantity of work performed by the worker for the organization, wherein the location/schedule dimension includes the combination of where and when work is performed by the worker for the organization, and wherein the role dimension includes the worker's responsibilities within the organization;

based on application of the information to the rules, automatically generating a career-life fit plan profile for the worker that most closely matches the current career-life fit objectives of the worker while complying with the predefined rules;

releasing the profile to the worker for review and at least one of approval and revision in accordance with the current career-life fit objectives of the worker and the predefined rules;

retaining the profile as an operative career-life fit plan for the worker that defines the worker's job parameters within the organization if the profile is approved by the worker on initial release to the worker;

if the profile is not approved by the worker on initial release to the worker and is revised by the worker, releasing the profile as revised to an assigned counselor representing the organization for review and at least one of approval and revision;

iteratively reviewing, revising and releasing the profile between the counselor and the worker until the profile is approved by both the worker and the counselor; and retaining the profile as the operative career-life fit plan for the worker that defines the worker's job parameters within the organization when the profile is approved by both the worker and the counselor.

8. The program storage device according to claim 7, wherein the profile represents each of the career dimensions as a continuum of selection points defined between two endpoints, the selection points being selectively selectable.

9. The program storage device according to claim 7, further comprising updating at least one of an administration and leadership function within the organization with the operative career-life fit plan for the worker.

* * * * *